(12) United States Patent
Abraham et al.

(10) Patent No.: US 8,923,516 B2
(45) Date of Patent: Dec. 30, 2014

(54) SYSTEMS AND METHODS FOR SECURELY TRANSMITTING AND RECEIVING DISCOVERY AND PAGING MESSAGES

(71) Applicant: Qualcomm Incorporated, San Diego, CA (US)

(72) Inventors: Santosh Paul Abraham, San Diego, CA (US); George Cherian, San Diego, CA (US); Rolf De Vegt, San Francisco, CA (US)

(73) Assignee: Qualcomm Incorporated, San Diego, CA (US)

( * ) Notice: Subject to any disclaimer, the term of this patent is extended or adjusted under 35 U.S.C. 154(b) by 21 days.

(21) Appl. No.: 13/840,210

(22) Filed: Mar. 15, 2013

(65) Prior Publication Data

US 2014/0064487 A1    Mar. 6, 2014

Related U.S. Application Data

(60) Provisional application No. 61/717,014, filed on Oct. 22, 2012, provisional application No. 61/694,536, filed on Aug. 29, 2012.

(51) Int. Cl.
| | |
|---|---|
| *H04L 9/00* | (2006.01) |
| *H04K 1/00* | (2006.01) |
| *H04W 12/04* | (2009.01) |
| *H04L 29/06* | (2006.01) |
| *H04L 29/12* | (2006.01) |
| *H04W 8/26* | (2009.01) |
| *H04W 12/02* | (2009.01) |
| *H04L 9/08* | (2006.01) |
| *H04W 84/12* | (2009.01) |

(52) U.S. Cl.
CPC ............. *H04W 12/04* (2013.01); *H04L 63/045* (2013.01); *H04L 9/0869* (2013.01); *H04L 61/2092* (2013.01); *H04L 63/0414* (2013.01); *H04W 8/26* (2013.01); *H04W 12/02* (2013.01); *H04W 84/12* (2013.01); *H04L 61/6022* (2013.01); *H04L 9/0811* (2013.01)
USPC .............................. 380/270; 380/44; 713/150

(58) Field of Classification Search
None
See application file for complete search history.

(56) References Cited

U.S. PATENT DOCUMENTS

| | | | |
|---|---|---|---|
| 7,440,418 | B2 | 10/2008 | Marinier et al. |
| 7,613,426 | B2 | 11/2009 | Kuehnel et al. |

(Continued)

FOREIGN PATENT DOCUMENTS

| | | |
|---|---|---|
| EP | 1379029 A1 | 1/2004 |
| EP | 1732265 A1 | 12/2006 |
| EP | 2028794 A1 | 2/2009 |
| EP | 2387206 A1 | 11/2011 |
| WO | 2008020856 A1 | 2/2008 |

OTHER PUBLICATIONS

Ahmed Reaz et al., "Resource and service discovery in large-scale multi-domain networks", IEEE Communications Surveys, IEEE, New York, NY, US, Oct. 1, 2007, vol. 9, No. 4, pp. 2-30, XP011383440, ISSN: 1553-877X, DOI: 10. 1109/COMST.2007. 4444748.

(Continued)

*Primary Examiner* — Fatoumata Traore
(74) *Attorney, Agent, or Firm* — S. Hossain Beladi

(57) ABSTRACT

Methods, devices, and computer program products for transmitting and receiving discovery and paging messages in a wireless communication device are described herein. In one aspect, a wireless apparatus operable in a wireless communication system comprises a processor configured to obfuscate a medium access control address of a frame by generating a random number and a transient address obfuscation key including a first transient key, wherein the transient address obfuscation key is a function of an address obfuscation key and the random number; including the random number in an address obfuscation header field of the frame; and replacing an original first address in an address field of the frame with a new first address that is a function of the original first address and the first transient key. The processor is further configured to include an indication of the obfuscation in a first field of the frame. The wireless apparatus further comprises a transmitter configured to transmit the frame to a receiving device.

12 Claims, 19 Drawing Sheets

(56) References Cited

U.S. PATENT DOCUMENTS

| | | | |
|---|---|---|---|
| 8,170,481 B2 | 5/2012 | Rangarajan et al. | |
| 8,306,475 B2 | 11/2012 | Cheshire | |
| 8,335,918 B2* | 12/2012 | Shon et al. | 713/160 |
| 2003/0177267 A1 | 9/2003 | Orava et al. | |
| 2004/0006642 A1 | 1/2004 | Jang et al. | |
| 2006/0120317 A1 | 6/2006 | Zheng | |
| 2006/0153375 A1* | 7/2006 | Yi | 380/44 |
| 2010/0177693 A1* | 7/2010 | Ryu et al. | 370/328 |
| 2012/0054848 A1 | 3/2012 | Salowey et al. | |
| 2014/0064185 A1 | 3/2014 | Abraham et al. | |
| 2014/0064481 A1 | 3/2014 | Abraham et al. | |
| 2014/0064486 A1 | 3/2014 | Abraham et al. | |

OTHER PUBLICATIONS

Buford J. et al., "Property-Based Peer Trust in the Sleeper Service Discovery Protocol", 30th Annual International Computer Software and Applications Conference (COMPSAC) (IEEE Cat. No. 06P2655) IEEE Piscataway, NJ, USA, IEEE, Sep. 1, 2006, pp. 209-214, XP031021924, DOI: 10.1109/COMPSAC.2006.151, ISBN: 978-0-7695-2655-3.

Buford John et al., "An Integrated Peer-to-Peer Data and Service Dissemination System", 4th IEEE Consumer Communications and Networking Conference (CCNC), IEEE, PI, Jan. 1, 2007, pp. 546-549, XP031087844, ISBN: 978-1-4244-0667-8.

International Search Report and Written Opinion—PCT/US2013/053474—ISA/EPO—Nov. 19, 2013.

Leung Adrian et al., "A Device Management Framework for Secure Ubiquitous Service Delivery", Fourth International Conference on Information Assurance and Security (ISIAS), IEEE, Piscataway, NJ, USA, Sep. 8, 2008, pp. 267-274, XP031322180, ISBN: 978-0-7695-3324-7.

Leung Adrian et al., "Ninja: Non Identity Based, Privacy Preserving Authentication for Ubiquitous Environments", Sep. 16, 2007, UBICOMP 2007: Ubiquitous Computing; [Lecture Notes in Computer Science], Springer Berlin Heidelberg, Berlin, Heidelberg, pp. 73-90, XP019070921, ISBN: 978-3-540-74852-6.

\* cited by examiner

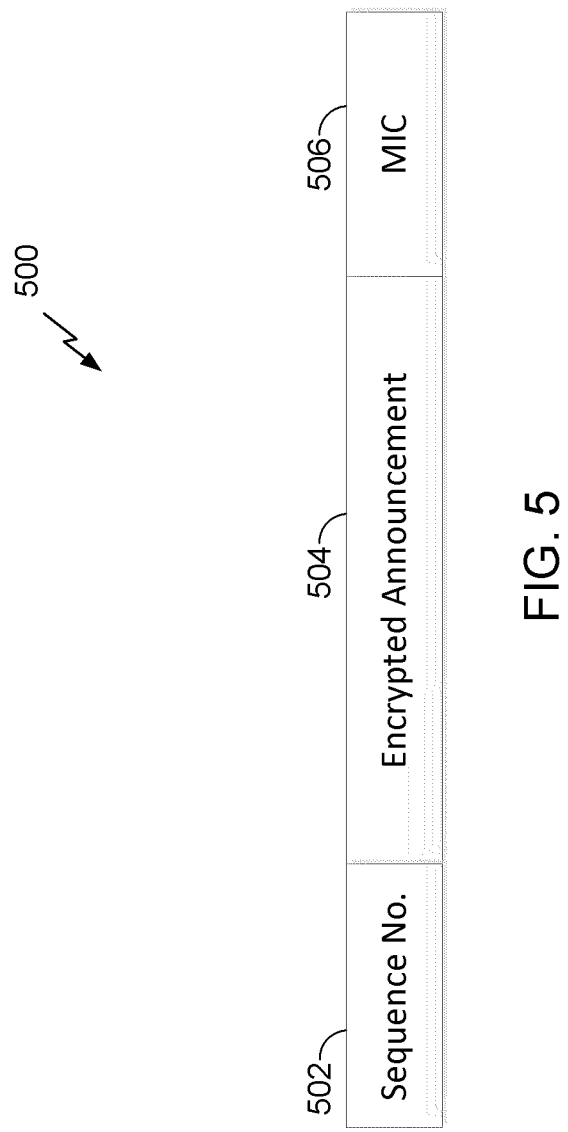

SYSTEMS AND METHODS FOR SECURELY TRANSMITTING AND RECEIVING DISCOVERY AND PAGING MESSAGES

The present application claims priority to provisional U.S. Application Ser. No. 61/694,536, entitled "SYSTEMS AND METHODS FOR SECURELY TRANSMITTING AND RECEIVING DISCOVERY AND PAGING MESSAGES," filed Aug. 29, 2012, assigned to the assignee hereof and incorporated herein by reference in its entirety. The present application further claims priority to provisional U.S. Application Ser. No. 61/717,014, entitled "SYSTEMS AND METHODS FOR SECURELY TRANSMITTING AND RECEIVING DISCOVERY AND PAGING MESSAGES," filed Oct. 22, 2012, assigned to the assignee hereof and incorporated herein by reference in its entirety.

BACKGROUND

1. Field

The present application relates generally to wireless communications, and more specifically to systems, methods, and devices for securely transmitting and receiving discovery and paging messages.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network may transmit and/or receive information to and from each other. The information may comprise packets, which in some aspects may be referred to as data units. The packets may include overhead information (e.g., header information, packet properties, etc.) that helps in routing the packets through the network, identifying the data in the packets, processing the packets, etc. The packets may further include data, such as user data, multimedia content, etc. that may be carried in a payload of the packet. Packets may additionally be used to introduce two different devices communicating on a medium. The communication medium may be shared by multiple devices and may be monitored by potentially harmful devices seeking to misuse (e.g., intercept, replay, etc.) the communicated packets. Thus, improved systems, methods, and devices for securing the communication of packets or messages transmitted and/or received via the medium are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure is a wireless apparatus operable in a wireless communication system comprising a processor configured to obfuscate a medium access control address of a frame by: generating a random number and a transient address obfuscation key including a first transient key, wherein the transient address obfuscation key is a function of an address obfuscation key and the random number; including the random number in an address obfuscation header field of the frame; and replacing an original first address in an address field of the frame with a new first address that is a function of the original first address and the first transient key. The processor is further configured to include an indication of the obfuscation in a first field of the frame. The wireless apparatus further comprises a transmitter configured to transmit the frame to a receiving device.

Another aspect of the disclosure is a method of securely transmitting packets in a wireless communication system, comprising obfuscating a medium access control address of a frame by: generating a random number and a transient address obfuscation key including a first transient key, wherein the transient address obfuscation key is a function of an address obfuscation key and the random number; including the random number in an address obfuscation header field of the frame; and replacing an original first address in an address field of the frame with a new first address that is a function of the original first address and the first transient key. The method further comprises including an indication of the obfuscation in a first field of the frame and transmitting the frame to a receiving device.

Yet another aspect of the disclosure is a wireless apparatus operable in a wireless communication system comprising, comprising means for obfuscating a medium access control address of a frame by: generating a random number and a transient address obfuscation key including a first transient key, wherein the transient address obfuscation key is a function of an address obfuscation key and the random number; including the random number in an address obfuscation header field of the frame; and replacing an original first address in an address field of the frame with a new first address that is a function of the original first address and the first transient key. The wireless apparatus further comprises means for including an indication of the obfuscation in a first field of the frame and means for transmitting the frame to a receiving device.

Yet another aspect of the disclosure is a computer program product, comprising: a computer-readable medium. The computer-readable medium comprises code that, when executed by a computer, causes the computer to obfuscate a medium access control address of a frame comprising: code for generating a random number and a transient address obfuscation key including a first transient key, wherein the transient address obfuscation key is a function of an address obfuscation key and the random number; code for including the random number in an address obfuscation header field of the frame; and code for replacing an original first address in an address field of the frame with a new first address that is a function of the original first address and the first transient key. The computer-readable medium further comprises code that, when executed by the computer, causes the computer to include an indication of the obfuscation in a first field of the frame and transmit the frame to a receiving device.

BRIEF DESCRIPTION OF THE DRAWINGS

FIG. 5 illustrates an exemplary portion of a discovery packet in accordance with aspects of the present disclosure.

DETAILED DESCRIPTION

Figure 1:
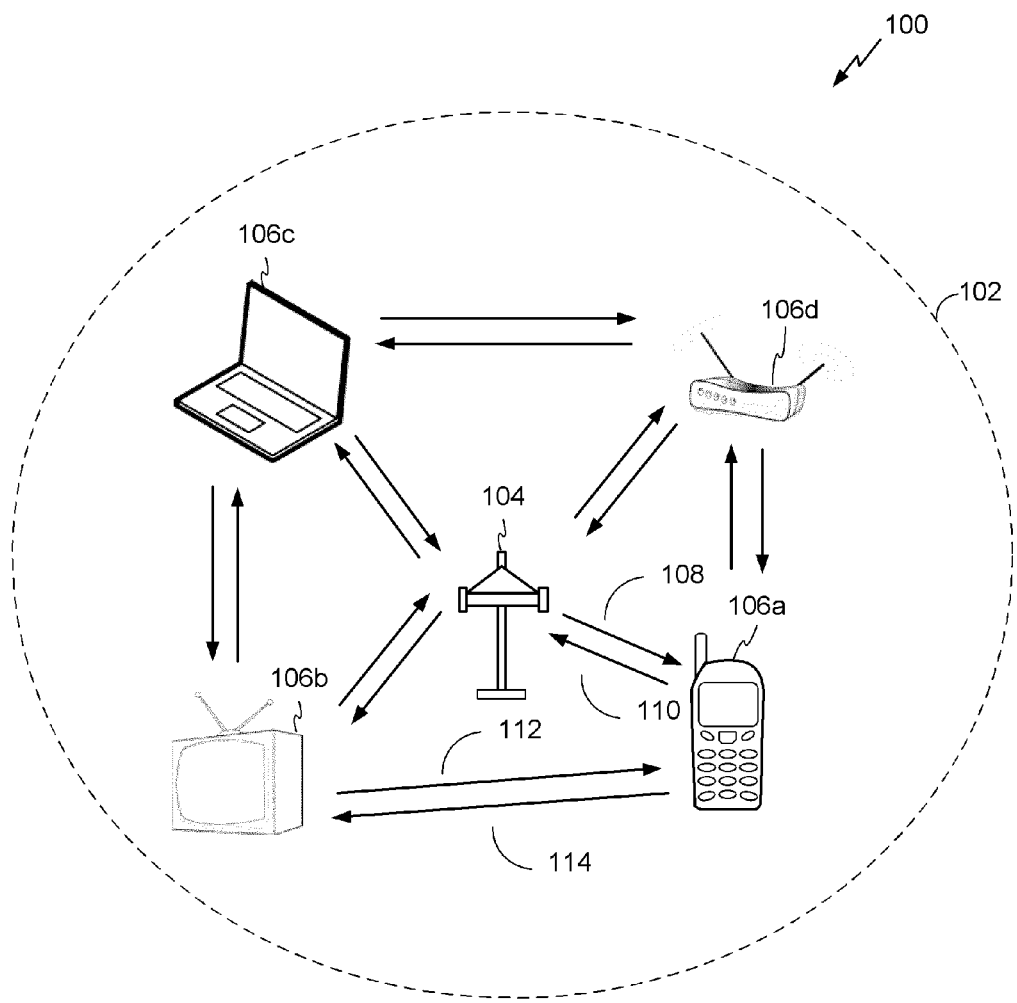
FIG. 1 illustrates an example of a wireless communication system in which aspects of the present disclosure may be employed.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a WiFi (e.g., IEEE 802.11 protocol) compliant wireless link to obtain general connectivity to the Internet or to other wide area networks. In some implementations a STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

Devices, such as a group of stations (STAs), for example, may be used for neighborhood aware networking, or social-WiFi networking For example, various STAs within the network may communicate on a device to device (e.g., peer-to-peer communications) basis with one another regarding applications that each of the STAs supports. It is desirable for a discovery protocol used in a social-WiFi network to enable STAs to advertise themselves (e.g., by sending discovery packets) as well as discover services provided by other STAs (e.g., by sending paging or query packets), while ensuring secure communication and low power consumption. It should be noted that a discovery packet may also be referred to as a discovery message or a discovery frame. It should also be noted that a paging or query packet may also be referred to as a paging or query message or a paging or query frame.

FIG. 1 illustrates an example of a wireless communication system 100 in which aspects of the present disclosure may be employed. The wireless communication system 100 may operate pursuant to a wireless standard, such as an 802.11 standard. The wireless communication system 100 may include an AP 104, which communicates with STAs 106. In some aspects, the wireless communication system 100 may include more than one AP. Additionally, the STAs 106 may communicate with other STAs 106. As an example, a first STA 106a may communicate with a second STA 106b. As another example, a first STA 106a may communicate with a third STA 106c although this communication link is not illustrated in FIG. 1.

A variety of processes and methods may be used for transmissions in the wireless communication system 100 between the AP 104 and the STAs 106 and between an individual STA, such as the first STA 106a, and another individual STA, such as the second STA 106b. For example, signals may be sent and received in accordance with OFDM/OFDMA techniques. If this is the case, the wireless communication system 100 may be referred to as an OFDM/OFDMA system. Alternatively, signals may be sent and received between the AP 104 and the STAs 106 and between an individual STA, such as the first STA 106a, and another individual STA, such as the second STA 106b, in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

A communication link may be established between STAs, such as during social-WiFi networking. Some possible communication links between STAs are illustrated in FIG. 1. As an example, a communication link 112 may facilitate transmission from the first STA 106a to the second STA 106b. Another communication link 114 may facilitate transmission from the second STA 106b to the first STA 106a.

The AP 104 may act as a base station and provide wireless communication coverage in a basic service area (BSA) 102. The AP 104 along with the STAs 106 associated with the AP 104 and that use the AP 104 for wireless communications may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
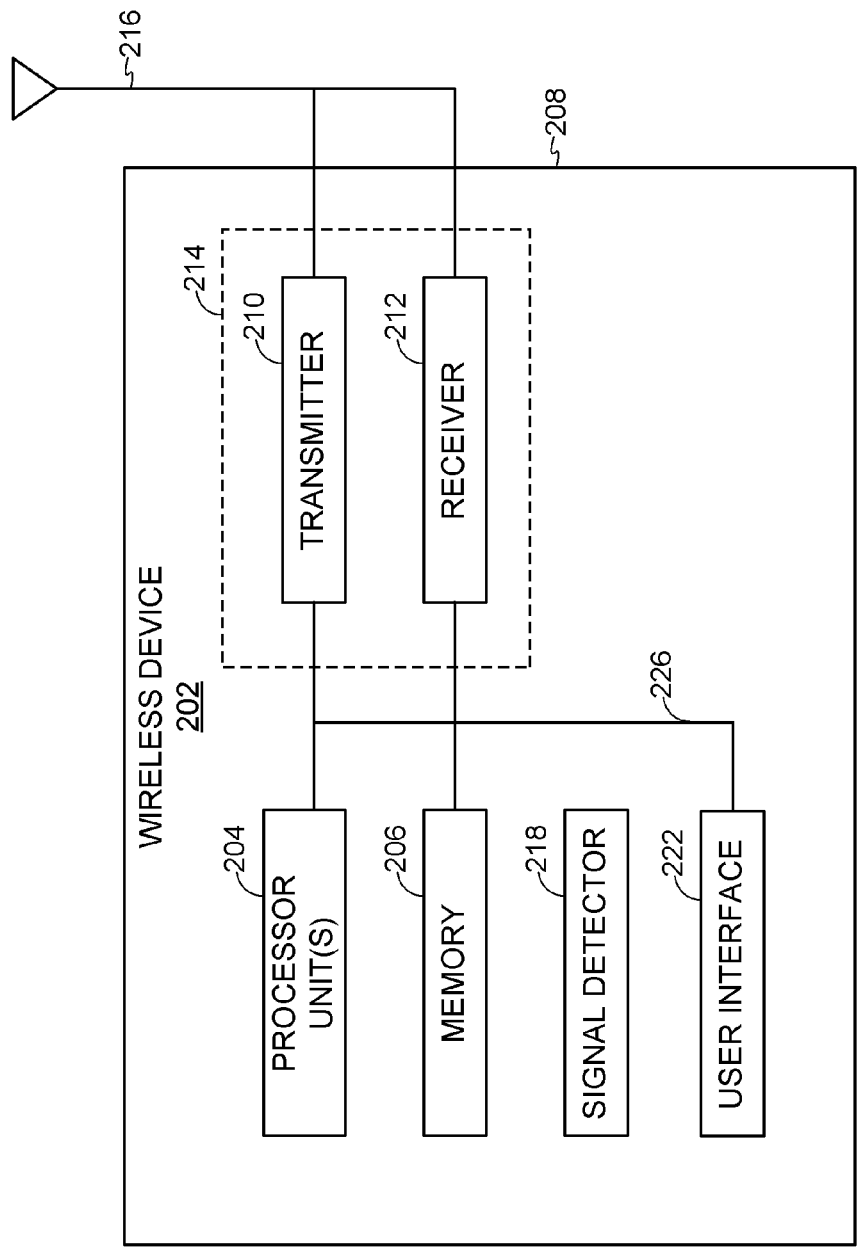
FIG. 2 illustrates a functional block diagram of a wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different packet types or functions. For example, the transmitter 210 may be configured to transmit packets of different types generated by the processor 204. When the wireless device 202 is implemented or used as an AP 104 or STA 106, the processor 204 may be configured to process packets of a plurality of different packet types. For example, the processor 204 may be configured to determine the type of packet and to process the packet and/or fields of the packet accordingly. When the wireless device 202 is implemented or used as an AP 104, the processor 204 may also be configured to select and generate one of a plurality of packet types. For example, the processor 204 may be configured to generate a discovery packet comprising a discovery message and to determine what type of packet information to use in a particular instance.

The receiver 212 may be configured to wirelessly receive packets having different packet types. In some aspects, the receiver 212 may be configured to detect a type of a packet used and to process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. The components of the wireless device 202 may be coupled together or accept or provide inputs to each other using some other mechanism.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

To ensure proper communication between devices such as AP 104 and the STAs 106 or between multiple STAs 106, the AP 104 or STAs 106 may require information regarding characteristics of the AP 104 or STAs 106. For example, the STA 106 may require timing information about the AP 104 in order to synchronize timing of communication between the STA 106 and the AP 104. Additionally or alternatively, the STA 106 may require other information such as a medium access control (MAC) address of the AP 104 or another STA, an identifier of the basic service set (BSS) served by the AP 104, etc. The STA 106 may determine whether it needs such information independently, such as through software that is executed using memory 206 and processor 204.

The AP 104 or STA 106 may have a plurality of operational modes. For example, the STA 106 may have a first operational mode referred to as an active mode, normal operation mode, or full power mode. In the active mode, the STA 106 may always be in an "awake" state and actively transmit/receive data with another STA 106. Further, the STA 106 may have a second operational mode referred to as a power-save mode or sleep mode. In the power-save mode, the STA 106 may be in the "awake" state or may be in a "doze" or "sleep" state where the STA 106 does not actively transmit/receive data with another STA 106. For example, the receiver 212 and possibly DSP 220 and signal detector 218 of the STA 106 may operate using reduced power consumption in the doze state. Further, in the power-save mode, a STA 106 may occasionally enter the awake state to listen to messages from an AP 104 or from other STAs (e.g., paging messages) that indicate to the STA 106 whether or not the STA 106 needs to "wake up" (e.g., enter the awake state) at a certain time so as to be able to transmit/receive data with the AP 104 or another STA.

Figure 3A:
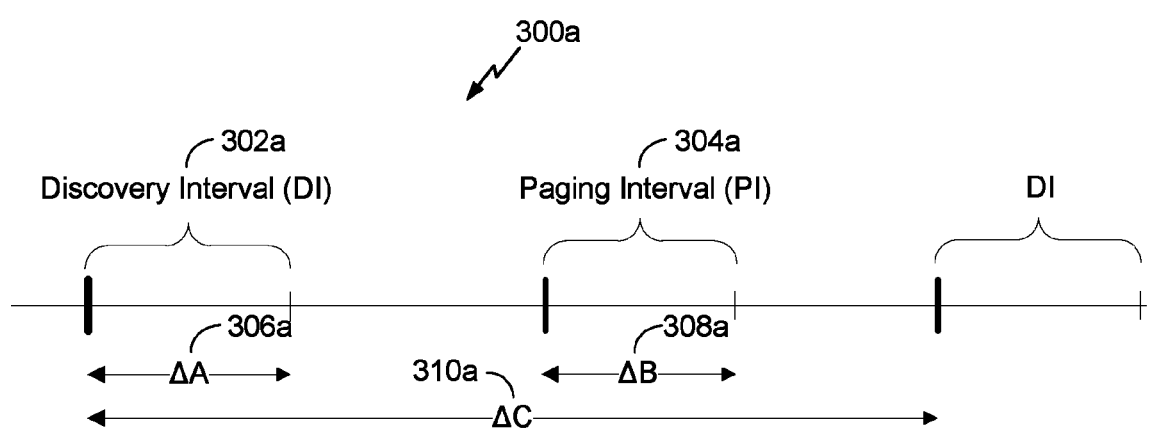
FIG. 3a illustrates an exemplary communication timeline in a wireless communication system in accordance with aspects of the present disclosure.

FIG. 3a illustrates an exemplary communication timeline 300a in a wireless communication system where devices may communicate via one channel. The exemplary communication timeline 300a may include a discovery interval (DI) 302a of a time duration ΔA 306a, a paging interval (PI) 304a of a time duration ΔB 308a, and an overall interval of a time duration ΔC 310a. In some aspects, communications may occur via other channels as well. Time increases horizontally across the page over the time axis.

During the DI 302a, APs or STAs may advertise services through broadcast messages such as discovery packets. APs or STAs may listen to broadcast messages transmitted by other APs or STAs. In some aspects, the duration of DIs may vary over time. In other aspects, the duration of the DI may remain fixed over a period of time. The end of the DI 302a may be separated from the beginning of the subsequent PI 304a by a first remainder period of time as illustrated in FIG. 3a. The end of the PI 304a may be separated from the beginning of a subsequent DI by a different remainder period of time as illustrated in FIG. 3a.

During the PI 304a, APs or STAs may indicate interest in one or more of a plurality of services advertised in a broadcast message by transmitting paging request messages such as paging request packets. APs or STAs may listen to paging request messages transmitted by other APs or STAs. In some aspects, the duration of the PI may vary over time. In other aspects, the duration of the PI may remain constant over a period of time. In some aspects, the duration of the PI may be less than the duration of the DI.

The overall interval of duration ΔC 310a may measure the period of time from the beginning of one DI to the beginning of a subsequent DI as illustrated in FIG. 3a. In some aspects, the duration of the overall interval may vary over time. In other aspects, the duration of the overall interval may remain constant over a period of time. At the conclusion of the overall interval of duration ΔC 310a, another overall interval may begin, including a DI, a PI, and the remainder intervals. Consecutive overall intervals may follow indefinitely or continue for a fixed period of time.

A STA may enter a sleep or power-save mode when the STA is not transmitting or listening or is not expecting to transmit or listen. As an example, the STA may sleep during periods other than the DI or PI. The STA in the sleep mode or power-save mode may awake or return to normal operation or full power mode at the beginning of the DI or PI to enable transmission or listening by the STA. In some aspects, the STA may awake or return to normal operation or full power mode at other times when the STA expects to communicate with another device, or as a result of receiving a notification packet instructing the STA to awake. The STA may awake early to ensure that the STA receives a transmission.

As described above, during the DI, APs or STAs may transmit discovery packets (DPs). During the PI, APs or STAs may transmit paging request packets (PRs). A DP may be a packet configured to advertise a plurality of services provided by a STA or AP and to indicate when the paging interval is for the device that transmits the discovery packet. The DP may include a data frame, management frame, or management action frame. The DP may carry information generated by a higher layer discovery protocol or an application based discovery protocol. The PR may be a packet configured to indicate interest in at least one of the plurality of services provided by an AP or STA.

The start and end of the DI and PI may be known via numerous methods to each STA desiring to transmit a discovery packet or a paging request packet. In some aspects, each STA may synchronize its clock with the other APs or STAs and set a shared DI and PI start time and DI duration and PI duration. In other aspects, a device may send a signal such as a special clear to send (S-CTS) signal to clear the medium of legacy communications, such as communications that may conflict or not be compliant with aspects of the present disclosure, and indicate the beginning and duration of the DI or PI period, as well as additional information about the DI and PI durations.

A STA potentially interested in services advertised via discovery packets, such as from other STAs, may awake or remain awake during the DI and process discovery packets to determine if a particular discovery packet includes information about one or more of a plurality of services that may be of interest to the receiving STA. After the DI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next PI. At the beginning of the PI, the interested STA may awake to transmit a paging request packet to the provider of the service.

A STA waiting for a response to a transmitted discovery packet, such as discovery packets transmitted to other STAs, may awake or remain awake during the PI and process paging request packets to determine if a particular paging request packet indicates interest by another device in at least one of plurality of services provided by the STA. After the PI period, STAs not planning to communicate information may enter a sleep or power-save mode for a break period until the next time the STAs plan to communicate. In some aspects, a STA may enter the sleep or power-save mode until the STA may communicate additional information with another device outside of the DI or PI. In some aspects, the STA may enter the sleep or power-save mode until the beginning of the next DI.

As examples, the duration $\Delta C$ of the overall interval may equal approximately one to five seconds in some aspects. In other aspects, the overall interval may be less than one second or more than five seconds. The duration $\Delta A$ of the DI may equal approximately 16 ms in some aspects while more or less than 16 ms in other aspects. The duration $\Delta B$ of the PI may equal approximately the duration $\Delta A$ in some aspects. In other aspects, the duration $\Delta B$ may be more or less than the duration $\Delta A$.

Figures 3B, 3C:
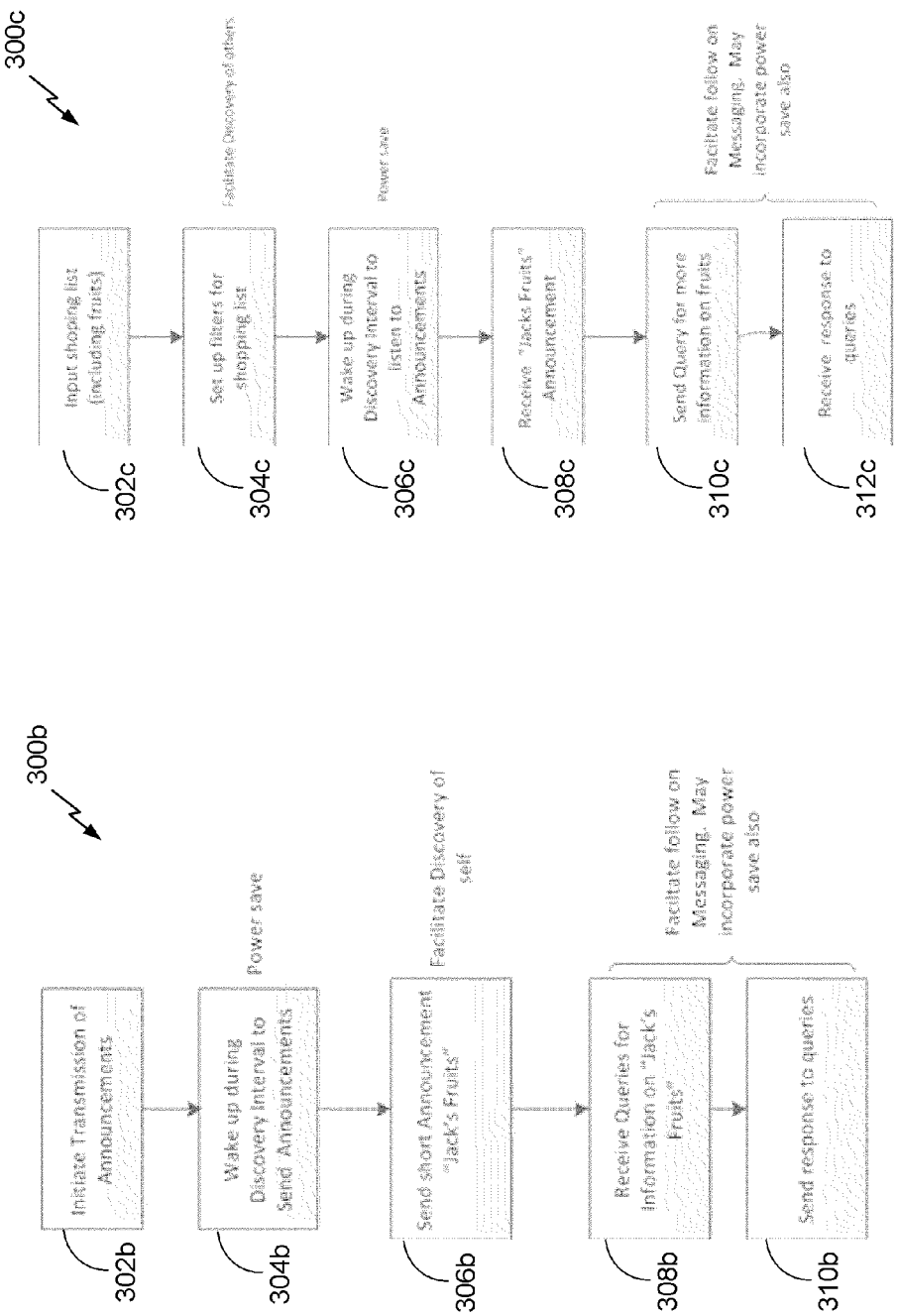
FIG. 3b is a flowchart of an exemplary process of discovering devices in a wireless communication system in accordance with aspects of the present disclosure.
FIG. 3c is a flowchart of an exemplary process of querying devices in a wireless communication system in accordance with aspects of the present disclosure.

FIG. 3b is a flowchart of an exemplary process 300b of discovering devices in a wireless communication system in accordance with aspects of the present disclosure. The process 300b may be used to introduce two devices, such as two STAs. For example, a STA may advertise information about one or more of a plurality of services that may be of interest to various other STAs to which the information is directed. In some embodiments, a service offered by a STA may include a service offered by an application (e.g., a gaming application, a shopping application, a social networking application, etc.) that a user has downloaded or that is native to the STA. For example, a user of the STA may want to invite other users of the application to interact with the user via the application. At block 302b, the STA may initiate transmission of announcements. Each announcement may include a discovery packet or message including the information relating to the one or more services. At block 304b, the STA may wake up from a power-save mode or sleep mode during a discovery interval to send announcements to one or more STAs. At block 306b, the STA may send one or more short announcements regarding a particular service, such as "Jack's Fruits," in order to facilitate discovery of the STA. The short announcements may include a discovery packet or message. The receiving STAs that are interested in the one or more services advertised by the STA may respond with a paging request (or query request) packet or message that indicates interest in the service provided by the STA. At block 308b, the STA may receive queries (e.g., a paging or query request) for information on the particular service, such as "Jack's Fruits." In response, at block 310b, the STA may send a response to the queries. Follow on messaging between the STA and the various querying STAs may occur. The STA and the various STAs may enter power-save mode or sleep mode in the intervals between the exchanges of messages between the STAs. The receiving may be performed by receiver 212 or the transceiver 214, for example, and the transmitting may be performed by the transmitter 210 or the transceiver 214, for example.

FIG. 3c is a flowchart of an exemplary process 300c of querying devices in a wireless communication system in accordance with aspects of the present disclosure. At block 302c, a STA may input a shopping list, which may include various vendors that a user of the STA may have an interest. For example, a user may download a shopping list from the Internet. Although the process 300c is described with respect to a shopping application, those having ordinary skill in the art will appreciate that the process 300c applies to other applications, such as gaming applications, social networking applications, etc. At block 304c, the STA may set up filters for the shopping list. For example, a filter may be set up to allow the STA to wake up from a power-save mode or sleep mode only when a discovery packet or message is received for particular vendors or applications. At block 306c, the STA may wake up during a discovery interval to listen to announcements. Each announcement may include a discovery packet or message including information relating to one or more services offered by one or more other STAs. At block 308c, the STA may receive an announcement from a second STA, such as a "Jack's Fruits" announcement. The STA may determine whether it is interested in one or more sets of information related to the announcement and may respond with a paging request (or query request) packet or message that indicates its interest in the information. For example, if the STA is interested in a particular sale item offered by the second STA, the STA may respond with a paging request (or query request) packet or message. At block 310c, the STA sends a query for more information relating to the announcement, such as more information on Jack's Fruits. At block 312c, the STA may receive a response to one or more queries that the STA sent to other STAs regarding services offered by the other STAs.

It is desirable for the STAs described above (e.g., using a discovery protocol used in a social-WiFi network) to be able to advertise themselves, as well as discover services provided by other STAs, using a secure communication protocol and while keeping power consumption low. For example, it is desirable for a STA to advertise its offered services by securely sending discovery packets or messages and for the STA to discover services offered by other STAs by securely sending paging or query packets or messages.

Figure 4:
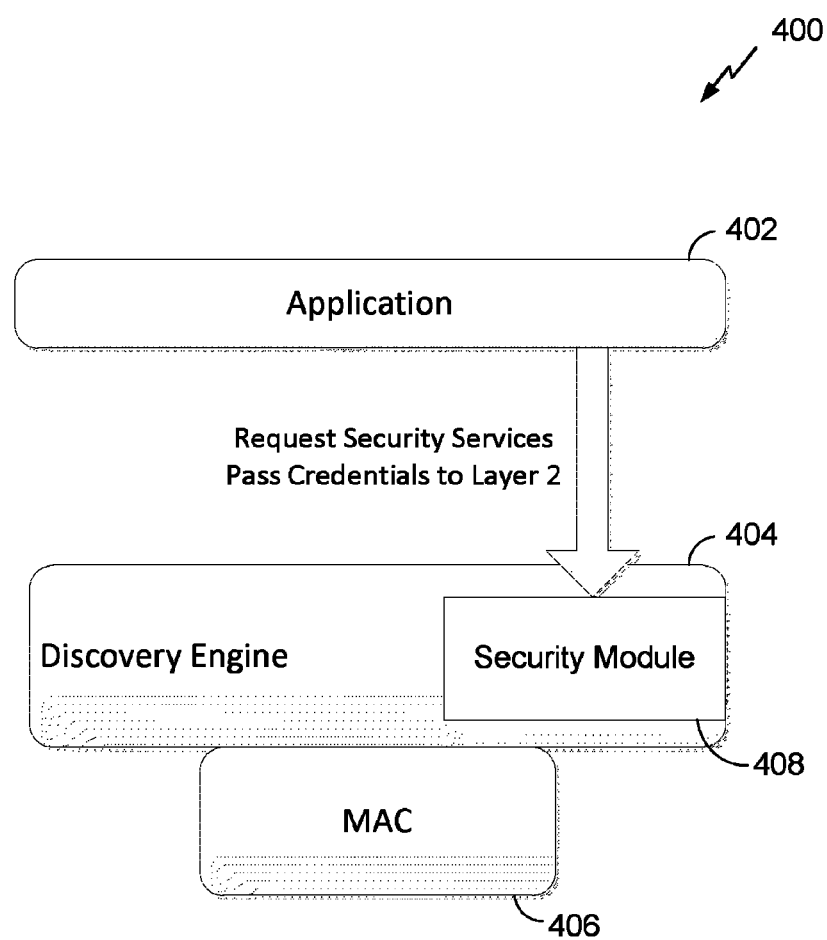
FIG. 4 illustrates a functional block diagram of a security system that may be employed within the wireless device of FIG. 2.

FIG. 4 illustrates a functional block diagram of a security system 400 that may be employed within the wireless device 202 of FIG. 2. The security system 400 includes a memory (not shown), an application 402, a discovery engine 404, a security module 408, and a medium access control 406 layer. The application may be stored in the memory, and may be executed by a computer or processor to provide one or more services. In some embodiments, the memory and the application 402 may be separate from the security system 400, and may be in communication with the security system. The wireless device 202 and/or the security system 400 may include a plurality of applications. The applications may include, for example, a gaming application, a music application, a shopping application, and the like, and may each provide services to the user of the wireless device 202 and to one or more receiving devices that are configured to receive discovery messages from the wireless device 202.

Each of the plurality of applications, including the application 402, may request security services from the security module 408. In some embodiments, the security module 408 may be included in the discovery engine 404. In other embodiments, the security module 408 may be separate from the discovery engine 404. Each of the applications, including the application 402, may pass credentials to the security module 408 in order to allow the security module 408 to properly secure messages or packets transmitted by the wireless device 202. The credentials may be specific to each particular application. The credentials may include an encryption key that is used to encrypt a message or packet that is intended to be transmitted to another wireless device. The discovery engine 404 and the security module 408 may reside within a layer 2 that is above the medium access control 406 layer so that the credentials are passed from the application 402 to the security module at layer 2. In some embodiments, the discovery engine and the security module 408 may reside within the medium access control layer. Examples of security services offered by the security module 408 include encryption of announcements (e.g., discovery messages or packets), encryption of paging or query messages or packets, authentication of peer devices (e.g., peer STAs), and medium access control obfuscation. For example, the security module 408 may use the credentials provided by the application 402 to encrypt a discovery packet, a paging request packet, or any other packets transmitted from the wireless device 202. The security module 408 may also authenticate other wireless devices that attempt to communicate with the wireless device 202. The security module 408 may also obfuscate the medium access control address of the wireless device 202 in order to prevent unauthorized use of packets sent to and from the wireless device 202.

Figure 5A:
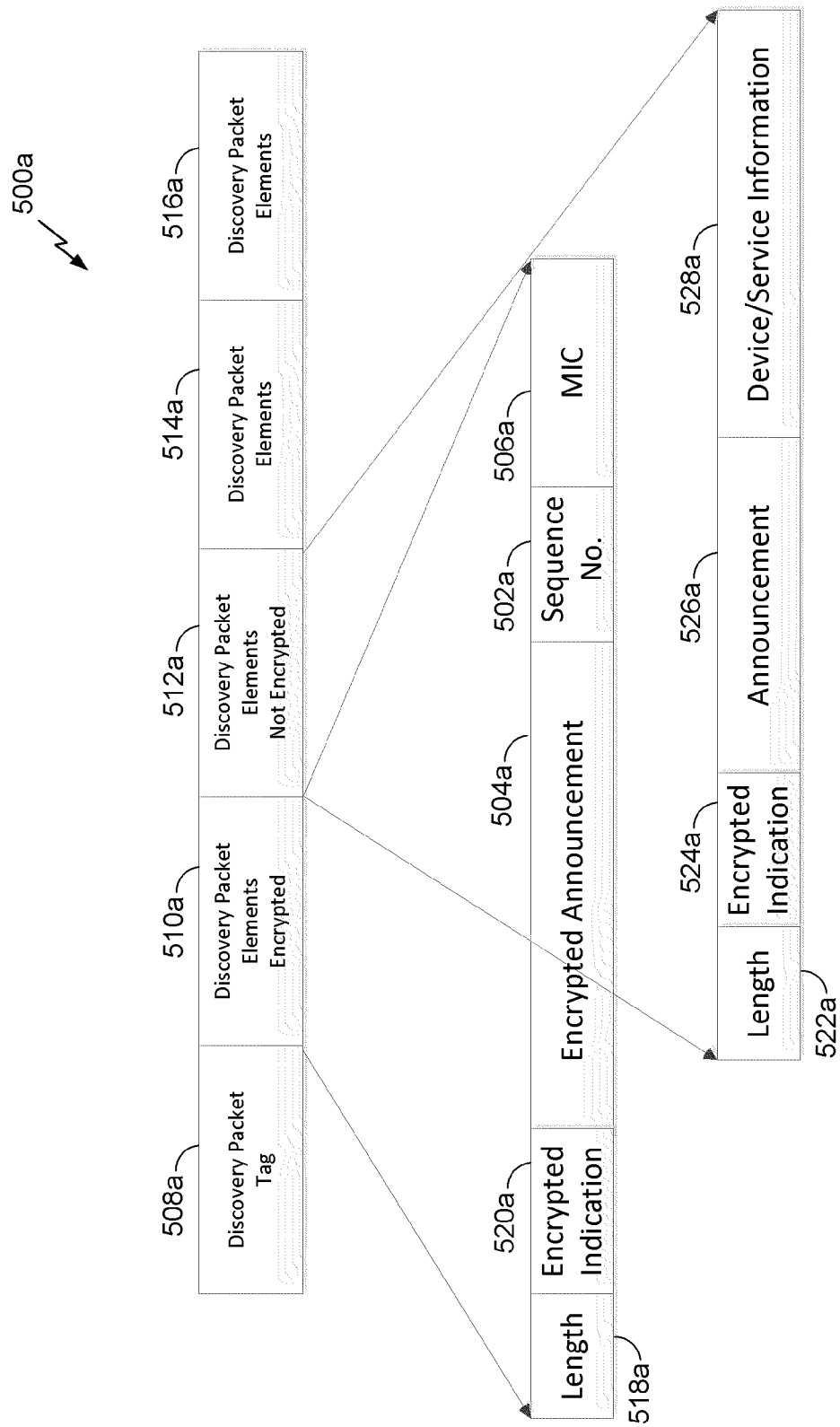
FIG. 5a illustrates an exemplary discovery packet in accordance with aspects of the present disclosure.

FIG. 5 illustrates an exemplary portion of a discovery packet 500 in accordance with aspects of the present disclosure. The portion of the discovery packet 500 illustrates an example of an encrypted field of a discovery packet that may be encrypted by the security module 408. The discovery packet may be transmitted from one STA to another STA in a social WiFi network. Various applications that are downloaded or that are native to a STA may require that announcement or discovery packets may be decoded only by a predetermined group of other STAs. For example, a gaming application may require that only subscribers to that application need to know if the gaming application is active (e.g., that the STA with the gaming application is broadcasting discovery packets), and thus may only provide those STAs for the particular subscribers with the credentials necessary for decoding packets or messages relating to that application. The credentials may provide the keys needed to encrypt and/or decrypt the information included in the packets. The credentials may be provided by the application. The portion of the discovery packet 500 includes various portions or sub-fields, including a sequence number sub-field 502, an encrypted announcement message sub-field 504, and a message integrity check (MIC) sub-field 506. It should be noted that the sub-fields of the discovery packet portion 500 described below do not necessarily need to be included in the discovery packet in the same order as described. Rather, the sub-fields may be included in any order or any portion of the discovery packet portion 500. The order of the sub-fields in a given discovery packet may be predetermined (e.g., programmed at manufacture of the device or upon initialization of the device, communicated in a separate message between wireless devices, etc.), however, such that the wireless devices (e.g., STAs) have information regarding which bits in the discovery packet correspond to which portions. It should also be noted that the portion of the discovery packet 500 may include other sub-fields with additional information, such as a length sub-field, an encryption indication sub-field, device/service information sub-field, etc., which will be discussed further below with respect to FIG. 5a.

The sequence number 502 may provide protection from attacks by unauthorized STAs that attempt to intercept information transmitted by a first STA. For example, an unauthorized STA may attempt a replay attack where the unauthorized STA attempts to intercept packets transmitted to and from the first STA. The unauthorized STA may then replay the packet to a legitimate STA in order to deceive the legitimate STA to believe that the replayed packet is legitimately sent by the first STA. The legitimate STA will not realize that the unauthorized STA has intercepted and replayed the packet because the unauthorized STA has not altered the packet. The sequence number 502 may be used to prevent this type of attack by incrementing or increasing each time the packet including the portion 500 is transmitted. A legitimate receiving STA will expect that the sequence number 502 is higher than it was last time it received a packet from the first STA, and thus will only accept a packet if it includes a sequence number that is higher than previously received. If a replayed packet is received by the legitimate STA, the sequence number will not be higher or will be lower than the sequence number last received by the legitimate STA, and the legitimate STA will not accept the replayed packet.

The encrypted announcement message 504 of the portion of the discovery packet 500 may include an application name, a wireless apparatus name (e.g., announcing STA name), an application description, a device description, user information, or any other private information relating to the announcing STA, application, and/or user of the STA. The announcement message 504 may be encrypted using any known encryption algorithm. For example, a temporal key integrity protocol may be used to encrypt the announcement message 504 using a 48 bit initialization vector. As another example, a Diffie-Hellman key exchange protocol may be used to encrypt the announcement message 504. The application that initiates the encryption may provide the keys necessary to perform the encryption and/or decryption. The encrypted announcement message (e.g., the encrypted application name, the encrypted wireless apparatus name, etc.) may be encrypted using the one or more credentials.

The MIC 506 of the portion of the discovery packet 500 may be used to further protect against unauthorized interception or use of the packets transmitted to or from the first STA. The MIC 506 may be used to protect the payload and/or the header of the packet by detecting packets that have been replayed or forged by an unauthorized STA. The MIC 506 may include a hash that is generated using a hashing algorithm. The MIC 506 may be generated for each packet and for each sender-receiver pair. In some embodiments, a first MIC may be used for a packet transmitted from the first STA to a legitimate STA sender and a second MIC may be used for a packet transmitted from the legitimate STA to the first STA. The MIC 506 may be based on a value used to produce a key (e.g., an initialization vector), a destination medium access control address, a source medium access control address, a priority, and/or the payload. The MIC 506 may be appended to the end of the portion of a discovery packet 500. Upon receiving a packet with a MIC 506, a receiving STA will attempt to validate the MIC 506. If a MIC failure is detected, countermeasures may be taken and the communication may be ended. If the MIC is verified by the receiving STA, the frame will be accepted and processed by the receiving STA. In some embodiments, after the MIC is verified, the receiving STA may note the value of the sequence number 502 so that future packets must include a sequence number greater than the noted value. Further, the transmitting STA may authenticate one or more receiving devices from which a paging packet is received using an authentication protocol, as described further below.

In some embodiments, a discovery packet may include multiple fields with one or more encrypted fields and one or more unencrypted fields. For example, FIG. 5a illustrates an exemplary discovery packet 500a in accordance with aspects of the present disclosure. The discovery packet 500a includes at least one encrypted field 510a and at least one unencrypted field 512a. Fields 514a and 516a may be encrypted or unencrypted, depending on the use of the particular discovery packet 500a. In some embodiments, the discovery engine 404a and/or the security module 408 may encrypt the fields and/or the information within the fields, and may insert the encrypted fields and unencrypted fields into the discovery packet 500a. In some embodiments, one or more applications or programs in a STA may require only certain information in an announcement or discovery packet or message to be encrypted. The one or more applications or programs may allow other information included in the announcement or discovery message to be made public or common for all STAs in the network to decode by leaving the information unencrypted. For example, a first application and a second application in the STA may prompt transmission of secure and non-secure information in an announcement to be transmitted in a discovery packet (e.g., discovery packet 500a). The STA may include the secure information from the first application in a first encrypted field (e.g., field 510a) and may include the non-secure information from the first application in a first unencrypted field (e.g., field 512a). The STA may further include the secure information from the second application in a second encrypted field (e.g., field 514a or 516a) and may include the non-secure information from the second application in a second unencrypted field (e.g., field 514a or 516a). Secure information, for example, may include information from a gaming application indicating that the gaming application is active, private information about a user of the application, password information, etc. Non-secure information may include any information that is not private and may include, for example, location information (e.g., a global positioning system (GPS) location, etc.), application and/or service type, information about non-proprietary applications on the STA, application name, wireless apparatus name, etc. It should be noted that the discovery packet 500a may include a greater or lesser number of encrypted and/or unencrypted fields, depending on the particular use of the discovery packet 500a. It should also be noted that more fields may be included in the discovery packet 500a than those illustrated in FIG. 5a.

Encrypted field 510a may include various sub-fields, such as a length sub-field 518a, an encrypted indication sub-field 520a, a sequence number sub-field 502a, an encrypted announcement message sub-field 504a, and a message integrity check (MIC) subfield 506a. The sequence number 502a, encrypted announcement message 504a, and message integrity check (MIC) 506a operate in the same manner as described above with respect to FIG. 5. The length sub-field 518a provides an indication to the receiving STA of a length (e.g., a number of bits) of the field 510a. The encrypted indication sub-field 520a provides an indication to the receiving STA as to whether the field 510a is encrypted or unencrypted. For example, the encrypted indication sub-field 520a may include a single bit with a value of 1 to indicate to the receiving STA that the field 510a is encrypted. One of skill in the art will understand that a single bit with a value of 0, or multiple bits with other bit value combinations, may also be used to indicate to the receiving STA that the field 510a is encrypted or unencrypted.

The unencrypted field 512a may include various sub-fields, such as a length sub-field 522a, an encrypted indication sub-field 524a, an unencrypted announcement message sub-field 526a, and a device/service information sub-field 528a. The length sub-field 522a provides an indication to the receiving STA of a length of the field 512a. The encrypted indication sub-field 524a provides an indication to the receiving STA as to whether the field 510a is encrypted or unencrypted, for example, using a single bit value of 0 or 1 or multiple bits with various bit value combinations. The unencrypted announcement message sub-field 526a may include non-secure information that an application or program on the announcing STA intends to be made public or common for all receiving STAs in the network to receive and decode. The device/service information sub-field 528a may also include non-secure unencrypted information intended to be made public or common for all receiving STAs to receive and decode. The information included in the device/service information sub-field 528a may specifically be related to device information of the announcing STA and/or service information offered by the announcing STA and/or an application on the announcing STA. Non-secure information may include any information that is not private and may include, for example, location information (e.g., a global positioning system (GPS) location, etc.), application and/or service type, information about non-proprietary applications on the STA, application name, wireless apparatus name, or any other information that the user and/or application does not intend to keep secret. For example, an application of an announcing STA may prompt transmission of non-secure announcement information regarding its GPS location so that any receiving STA may determine its position, non-secure announcement information relating to an application name of the application or wireless apparatus name of the STA, and secure announcement information regarding the particular user of the application. The non-secure location information may be included within the unencrypted device/service information sub-field 528a of the unencrypted field 512a, the non-secure application name information may be included within the unencrypted announcement message sub-field 526a of the unencrypted field 512a, and the secure message may be included within the encrypted announcement message sub-field 504a of the encrypted field 510a. Accordingly, the announcing STA may transmit the discovery packet 500a with secure and non-secure information using encrypted and unencrypted fields.

The discovery packet 500a may further include a discovery packet tag 508a. The discovery packet tag 508a may be used to uniquely identify the discovery packet 500a. In some embodiments, an announcing STA may continually change a medium access control (MAC) address included in a transmit address field (not shown) of the discovery packet to prevent one or unauthorized devices, such as an unauthorized STA, from tracking the announcing STA through the STA's MAC address. As a result, two or more STAs may occasionally use the same MAC address and/or the announcing STA may change its used MAC address before a searching STA can send a query based on the discovery packet or frame. The discovery packet tag 508a may be generated by the announcing STA (e.g., by the discovery engine 404 and/or security module 408) in order to uniquely identify the discovery packet. In some embodiments, the discovery packet tag 508a may be a randomly generated number generated by a random number generator in the announcing STA. For example, an announcing STA may transmit a discovery packet including a discovery packet tag generated by the announcing STA. At least one searching STA may receive the discovery packet. When a query is sent by a searching STA to the announcing STA based on the received discovery packet, the searching STA may set the receive address in a receive address field of the query packet to the transmit address that was included in a transmit address field of the received discovery packet. The searching STA may further include the discovery packet tag that was included in the received discovery packet. As a result, the announcing STA may uniquely determine that the query packet is intended for the announcing STA by checking the receive address as well as the discovery packet tag value. In some embodiments, the length of the discovery packet tag is made sufficiently large to ensure that the probability of two STAs choosing the same MAC address and the same discovery packet tag value is small. For example, the discovery packet tag length may be between 4 bytes and 32 bytes. As another example, the discovery packet length may be larger than 32 bytes if enough space is available in the discovery packet.

It should be noted that the sub-fields of the encrypted fields and unencrypted fields described above do not necessarily need to be included in the same order as described. Rather, the sub-fields may be included in any order or in any portion of the fields. It should also be noted that the encrypted and unencrypted fields may include more sub-fields with additional information or fewer sub-fields than that illustrated in FIG. 5a.

Figure 6:
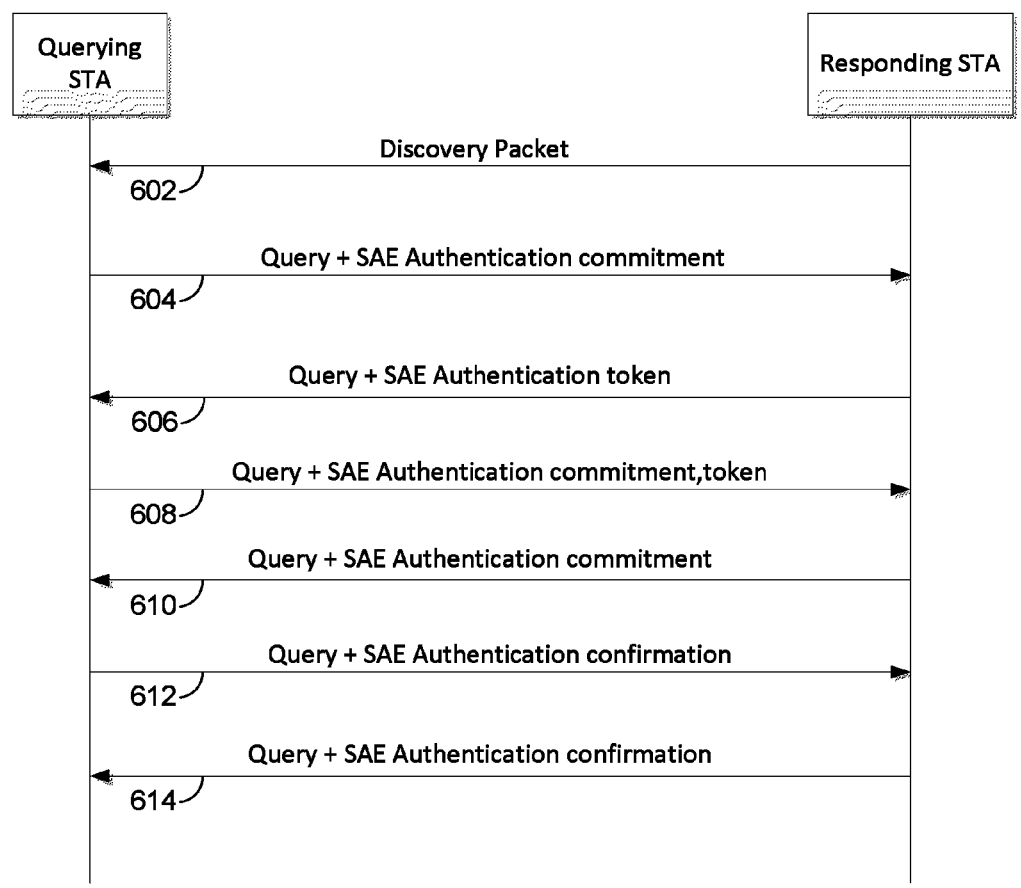
FIG. 6 illustrates an exemplary signal flow diagram illustrating signal flow exchanged among entities illustrated in FIG. 1.

FIG. 6 illustrates an exemplary signal flow diagram illustrating signal flow exchanged among entities illustrated in FIG. 1. The signal flow illustrated in FIG. 6 provides a mechanism for a STA to authenticate paging STAs that are responding to a discovery packet sent by the STA. Authentication of the paging STAs may be desired if an advertising STA wants only STAs with certain credentials paging it. For example, a social networking application on the paging STA using social WiFi may require that paging request packets should be dropped if they are not from STAs using the same social networking application. As another example, a gaming application on the paging STA may require that it verify that a paging request message is transmitted from another STA that is using the same gaming application.

In some embodiments, authentication of the peer STAs may include the use of an authentication protocol, such as a secure authentication of equals authentication protocol. The secure authentication of equals authentication protocol may be used to allow two peer STAs to securely verify possession of a shared password without the use of a central server. Each STA may initiate the protocol and are considered to be equals in the authentication process. An advertising STA may require that any STA that wants to send a paging request message to the advertising STA must complete the secure authentication of equals authentication process prior to paging the advertising STA. The secure authentication of equals authentication protocol includes each of the peer STAs individually defining the same password, which is used to authenticate the message exchange. The protocol does not require that any part of the password be exposed to threats from third parties because the password is not exchanged between the two STAs. A pairwise master key (PMK) is generated and shared between the STAs as a result of a successful authentication between the two STAs.

As a first and second STA authenticate each other, each STA may derive a number from a shared secret. The first STA may then transmit the derived number along with an identifier, which may be a scalar, to the second STA. The second STA will verify that the same number would be derived by it using the same identifier.

As illustrated in FIG. 6, the secure authentication of equals process includes two message exchanges between a querying STA and a responding STA, including a commitment exchange and a confirmation exchange. The commitment message exchange operates to force each STA to commit to a single guess of the password. The confirmation message exchange operates to prove that the password guess is correct. Authentication frames may be used to perform the message exchanges.

The message exchange begins at exchange 602 by the responding STA transmitting a discovery packet to the querying STA. The discovery packet may be used to advertise information about one or more of a plurality of services offered by the responding STA that may be of interest to the querying STA. The querying STA begins the secure authentication of equals process once it receives the discovery packet, which indicates that the responding STA requires authentication using the secure authentication of equals authentication protocol. At exchange 604, the querying STA responds with a query or paging packet with a secure authentication of equals commitment exchange message. Once the responding STA receives the commitment exchange message, it processes the message to verify whether the querying STA has guessed the password correctly. At exchange 610, the responding STA sends a query or paging packet with its own commitment exchange message. The querying STA receives the commitment exchange message and processes the message to verify whether the responding STA has guessed the password correctly.

A confirmation exchange message may not be transmitted until both STAs have committed. Once both STAs have committed, at exchange 612, the querying STA sends a query or paging packet with a secure authentication of equals confirmation exchange message. The responding STA receives the confirmation exchange message and accepts the authentication without sending a reply. At exchange 614, the responding STA sends a query or paging packet with its own secure authentication of equals confirmation exchange message. The querying STA receives the confirmation exchange message and accepts the authentication without sending a reply. The secure authentication of equals process is completed once both STAs have first sent a commitment exchange message then received a confirmation exchange message. Upon completion of the secure authentication of equals process, both the querying STA and the responding STA generate a PMK. Once the PMK is generated, the STAs may begin securely exchanging encrypted messages. If the authentication procedure completes successfully, each peer STA knows the other STA possesses the password and, as a by-product of the secure authentication of equals exchange, the two peer STAs establish a cryptographically strong key between them.

An anti-clogging token may further be used in the secure authentication of equals authentication protocol described above, for example at exchanges 606 and 608. A STA is required to do large amounts of processing upon receipt of a commitment exchange message. The anti-clogging token may prevent an attacker from forcing a STA to do unnecessary computations for the secure authentication of equals protocol. To implement the anti-clogging token, a STA maintains a counter indicating the number of pending commitment exchange messages. Once the counter meets a threshold requirement, the STA may respond to each received commitment exchange message with a rejection that includes an anti-clogging token. For example, the responding STA may, upon receiving the query or paging packet with the authentication commitment exchange message, respond with a rejection that includes a query or paging packet including an anti-clogging token at exchange 606. The querying STA must then include the anti-clogging token in a subsequent commitment exchange message. For example, at exchange 608, the querying STA responds with a query or paging packet including the anti-clogging token. The responding STA will reject all commitment exchange messages that do not include an anti-clogging token. In response to receiving a commitment exchange message without the anti-clogging token, the responding STA may send a request to the querying STA to resend the commitment exchange message with the anti-clogging token included.

The secure authentication of equals authentication protocol is immune from attacks based on relaying or replaying because an attacking STA is unable to determine either the password or the resulting PMK. The secure authentication of equals authentication protocol further prevents an attacking STA from making repeated guesses of the password. Compromise of a PMK from a previous run of the protocol also does not provide any advantages to an unauthorized STA attempting to determine the password or the shared key from any other instance.

Figure 7:
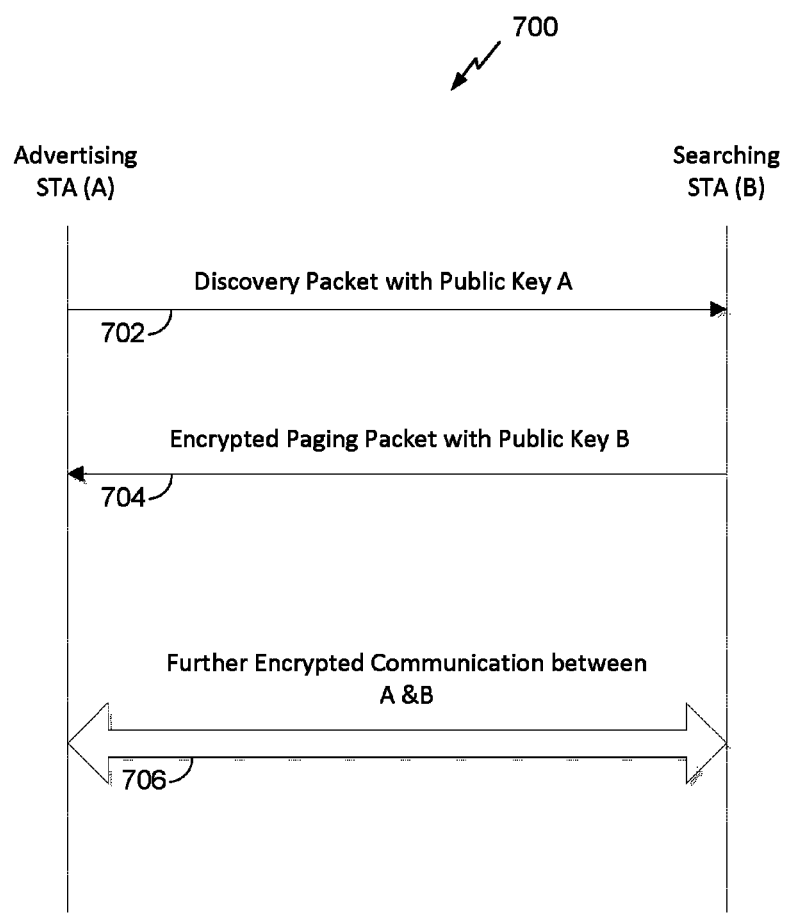
FIG. 7 illustrates another exemplary signal flow diagram illustrating signal flow exchanged among entities illustrated in FIG. 1.

FIG. 7 illustrates another exemplary signal flow diagram illustrating signal flow exchanged among entities illustrated in FIG. 1. The signal flow illustrated in FIG. 7 provides a mechanism for encrypting paging request packets. A paging or searching STA may want to secure a paging request packet to prevent the exposure of information relating to the paging STA to any unauthorized devices. For example, if a discovery packet received by a paging STA advertises multiple services, the paging STA may want to prevent a snooping device from determining the particular service that the paging STA is looking for. As another example, a discovery packet may request private information from a paging STA (e.g., an email address, address, password, etc.). It is desirable to secure any paging request packets that the paging STA may send to the advertising STA.

As illustrated in FIG. 7, an advertising STA may exchange messages with a searching or paging STA. To enable encryption of the paging packet, a Diffie-Hellman key exchange protocol may be used, which allows the two STAs to derive a secret key that may be used to encrypt communication between the two STAs. To implement the key exchange, the advertising STA and the paging STA agree to use a prime number p and a base number g. The term "p" is a prime number and "g" is primitive root equal to modulo p. The advertising STA generates a public key PK-A, which includes $g^a$ mod p. The term "a" is a first random number (i.e., a first randomly generated number) generated by the advertising STA that is only known by the advertising STA. The advertising STA includes the public key PK-A in the discovery packet and transmits the discovery packet to the searching STA at 702. The searching STA generates its own public key PK-B, which includes $g^b$ mod p. The term "b" is a second random number (i.e., a second randomly generated number) generated by the searching STA that is only known by the searching STA. The searching STA derives an encryption key based on the public key PK-A (i.e., $g^a$ mod p) and b. The encryption key that is derived is equal to $g^{ab}$ mod p. At 704, the searching STA encrypts a portion of a paging request packet using the derived encryption key and transmits the paging request packet including the encrypted message and the public key PK-B to the advertising STA. Once the public key PK-B is received, the advertising STA derives the same encryption key based on the public key PK-B (i.e., $g^b$ mod p) and a. Thus, the encryption key is derived by the advertising STA by calculating $g^{ba}$ mod p, which is equal to the encryption key. Because the advertising STA is the only device that knows a, and the searching STA is the only device that knows b, only these two STAs may determine the encryption key (i.e., $g^{ba}$ mod p) and decrypt encrypted messages using the key. Thus, only the advertising STA may decrypt the paging request packet received from the searching STA. At 706, further encrypted communications between the two STAs may be encrypted and decrypted using the shared encryption key.

Attacks by an unauthorized STA may be prevented by using an authentication procedure between the advertising STA and the searching STA. For example, an unauthorized STA may intercept a public key transmitted by the advertising STA and intended for the searching STA. The unauthorized STA may replace the intended public key with another public key generated by the unauthorized STA and send the replacement public key to the first STA. In some embodiments, to prevent the unauthorized use, the public keys may be certified or signed by the STAs. For example, the public key PK-A may be certified by the advertising STA using the randomly generated number a, and the public key PK-B may be certified or signed by the searching STA using b, so that the STAs may authenticate one another.

Figure 8:
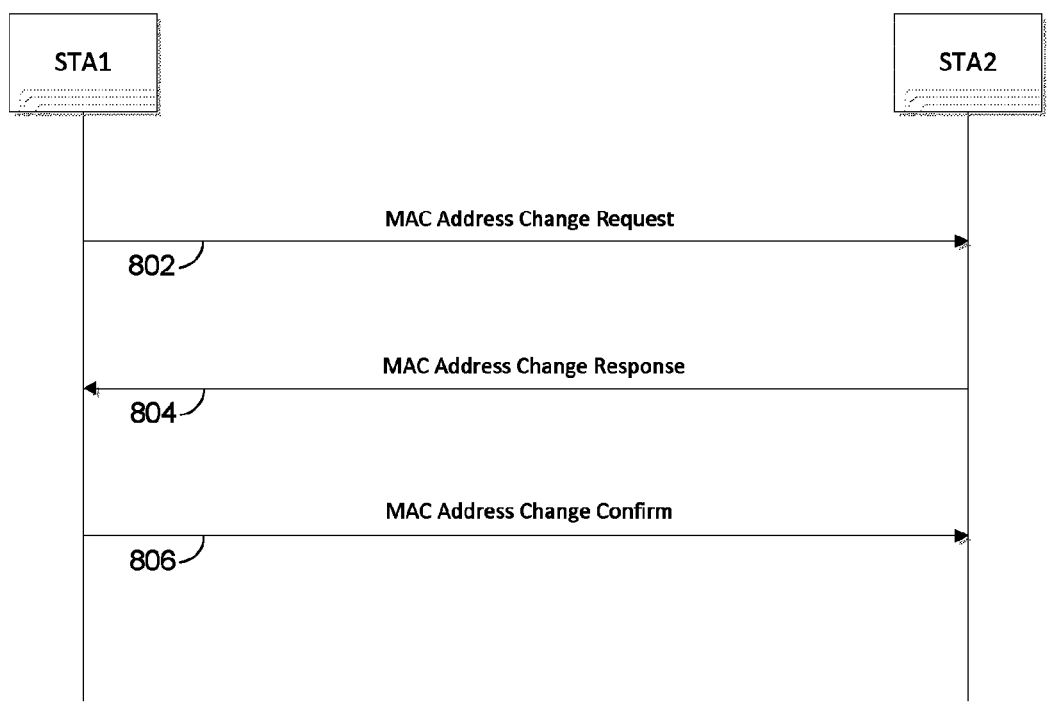
FIG. 8 illustrates another exemplary signal flow diagram illustrating signal flow exchanged among entities illustrated in FIG. 1.
Figure 9:
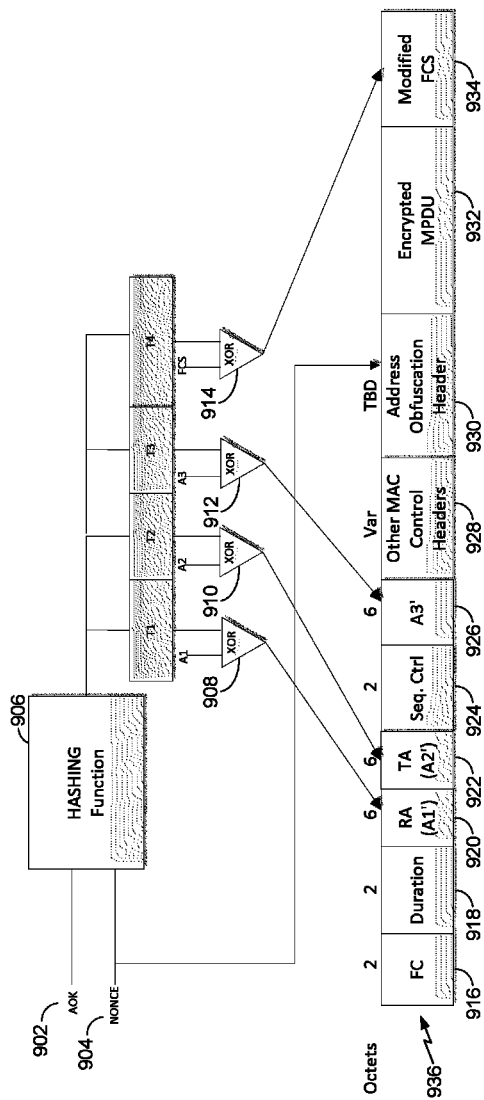
FIG. 9 illustrates a functional block diagram illustrating obfuscation of one or more medium access control addresses.

FIGS. 8 and 9 provide mechanisms for obfuscating the medium access control addresses of two devices that are in communication with one another. Medium access control addresses may be transmitted without encryption, which enables an attacking device (e.g., an attacking STA) to use the medium access control addresses in an unauthorized manner, such as to track communication between devices and/or track the presence of a device. Medium access control obfuscation may be used to reduce the ability of an attacking device to track the communication between two STAs or ATs by changing the medium access control addresses of either or both of the STAs or ATs. For example, the source and/or destination addresses may be changed to prevent an attack.

FIG. 8 illustrates an exemplary signal flow diagram illustrating signal flow exchanged among entities illustrated in FIG. 1, and provides one technique for obfuscating medium access control addresses of one or more devices. The technique illustrated in FIG. 8 allows the change of medium access control addresses over a period of time. Two devices, such as a first STA and a second STA or a first or AT and a second or AT, that intend to exchange data communication may negotiate a change of one or both of their medium access control addresses during their communication with one another. The change request may be sent in between a regular data communication interval. The sender or the receiver of transmitted data may initiate an address change request. At 802, the first STA (STA 1) transmits a medium access control address change request message to the second STA (STA 2) requesting that a new medium access control address be created for STA 1 (e.g., the source address). In some embodiments, the medium access control address change request includes the value of the new medium access control address. In some embodiments, the medium access control address change request does not include the value of the new medium access control address. In some embodiments, the medium access control address change request message may request a change in the medium access control address of STA2 (e.g., the destination address), or may request a change in the medium access control address of both STA 1 and STA 2. In response, at 804, STA 2 transmits a medium access control change response message to STA 1. The medium access control change request and response may be encrypted so that third party devices may not determine the new medium access control address. At 804, STA 1 transmits a medium access control address change confirm message to STA 2. In some embodiments, the medium access control address change confirm message includes the value of the new medium access control address. Following receipt of the medium access control address confirm message, all new data packets exchanged between STA 1 and STA 2 will include the new medium access control address of STA 1 and/or STA 2.

FIG. 9 illustrates a functional block diagram illustrating obfuscation of one or more medium access control addresses. The obfuscation technique illustrated in FIG. 9 allows the change of medium access control addresses from packet to packet. In applications that require a high degree of protection from tracking type attacks, it may be useful for both the source of data and the destination for data to change addresses from packet to packet. FIG. 9 further illustrates an example of a packet 936 transmitted from a source STA. Each packet, such as packet 936, exchanged between the source STA and a destination STA is populated with a different source address and destination address in the address 1 field 920, the address 2 field 922, and the address 3 field 926. For example, the receiver address may be included in the address 1 field (referred to as a receiver address (RA) field), the transmitter address may be included in the address 2 field (referred to as a transmitter address (TA) field), and the destination address may be included in the address 3 field. In order to ensure effectiveness of address obfuscation, a destination STA needs to quickly determine if a packet that it observes on the air is destined for it and needs to quickly send out an acknowledgement. Each destination STA generates its own secret address obfuscation key (AOK) 902 for address obfuscation. During the connection set up process, the destination STA sends the AOK 902 to the source STA.

Before transmitting a packet, the source STA generates a random number (Nonce) 904 and a corresponding transient address obfuscation key (TAOK). The TAOK is generated based on a hash function 906 of the AOK 902 concatenated with the random number 904. The output of the hash function 906 is a group of transient keys T1, T2, T3, and T4 that are concatenated with one another. For example, the TAOK is equal to HASH (AOK||Random Nonce) which is equal to T1||T2||T3||T4. T1, T2, T3, and T4 are transient keys that each include a string of bits, and that are used to obfuscate the medium access control addresses. In order to obfuscate the medium access control addresses, the address fields 920, 922, and 926 are replaced with obfuscated address fields as a function of the prior medium access control address and one or more of the transient keys. For example, the prior medium access control address A1 that was previously stored in the address 1 field 920 is replaced by A1', which is calculated as a function of A1 and T1. The function used to generate A1' may be an exclusive-OR function. For example, the function may provide that A1' is equal to XOR (A1,T1) using XOR function 908. As another example, the prior medium access control address A2 that was previously stored in the address 2 field 922 is replaced by A2', which is calculated as a function of A2 and T2. The function used to generate A2' may also be an exclusive-OR function. For example, the function may provide that A2' is equal to XOR (A2,T2) using XOR function 910. As another example, the prior medium access control address A3 that was previously stored in the address 3 field 926 is replaced by A3', which is calculated as a function of A3 and T3. The function used to generate A3' may be an exclusive-OR function. For example, the function may provide that A3' is equal to XOR (A3,T3) using XOR function 912.

A frame check sequence (FCS) is computed by the source STA for the packet 936. The FCS is then changed to a modified FCS and included in the FCS field 934. The modified FCS may be calculated as a function of the originally computed FCS and T4. The function used to generate the modified FCS may be an exclusive-OR function. For example, the function may provide that the modified FCS is equal to XOR (FCS,T4) using XOR function 914.

The source STA includes the random number 904 in an address obfuscation header field 930 of the packet 936. The frame control field 916 includes one or more bits that are used to indicate that the frame has an obfuscated medium access control address. For example, a 1 may be included in the frame control field 916 to indicate that the frame has an obfuscated medium access control header.

Once the obfuscated addresses and the modified FCS fields are calculated and included in the packet 936, the source STA transmits the packet to the destination STA. Upon receiving the packet 936, the destination STA generates the TAOK based on the random number 904 indicated in the address obfuscation header 930 and the secret AOK 902 that the destination STA originally generated. The destination STA then checks the RA field 920 of the frame 936 if the new medium access control address A1' (e.g., the destination address) matches after an XOR function of A1 and T1. The destination STA further checks the modified FCS after an XOR function of the original FCS with the T4. The FCS will fail at any device that does not know TAOK. If the FCS passes, the destination STA transmits an acknowledgment to A2', which is the new medium access control transmitting address of the source STA.

Figure 10:
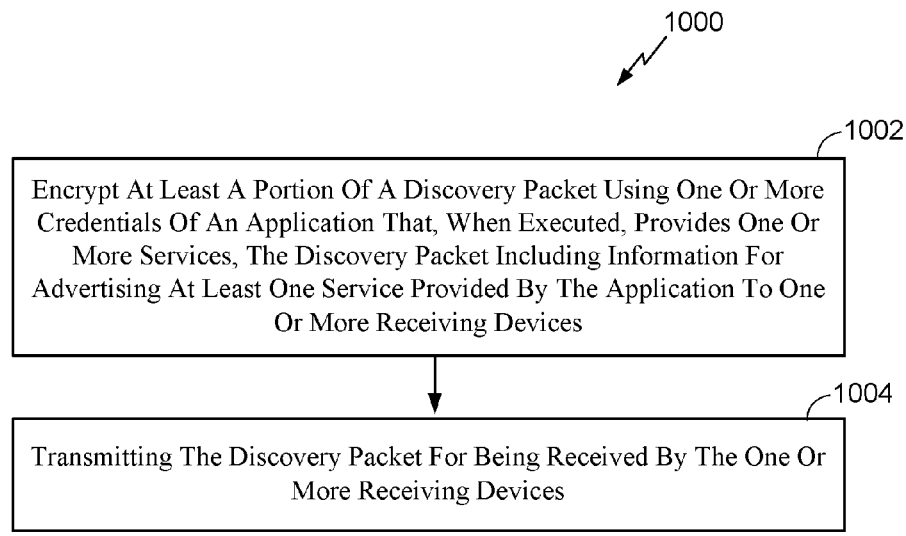
FIG. 10 is a flowchart of an exemplary process of securely transmitting packets in a wireless communication system in accordance with aspects of the present disclosure.

FIG. 10 is a flowchart of an exemplary process 1000 of securely transmitting packets in a wireless communication system in accordance with aspects of the present disclosure.

The process 1000 may be used to secure packets sent between devices as discussed in the description of FIGS. 4, 5 and 6, for example. Although the process 1000 is described below with respect to the elements of the wireless device 202, those having ordinary skill in the art will appreciate that other components may be used to implement one or more of the steps described herein.

The process 1000 begins at block 1002 by encrypting at least a portion of a discovery packet using one or more credentials of an application that, when executed, provides one or more services, the discovery packet including information for advertising at least one service provided by the application to one or more receiving devices. For example, a first STA may receive one or more credentials from an application that is downloaded to or that is native to the first STA and may encrypt a discovery packet using the credentials, such as the discovery packet discussed above with respect to FIGS. 5 and 5a. At block 1004, the process 1000 transmits the discovery packet for being received by the one or more receiving devices. The transmission may be performed by the transmitter 214, for example.

Figure 11:
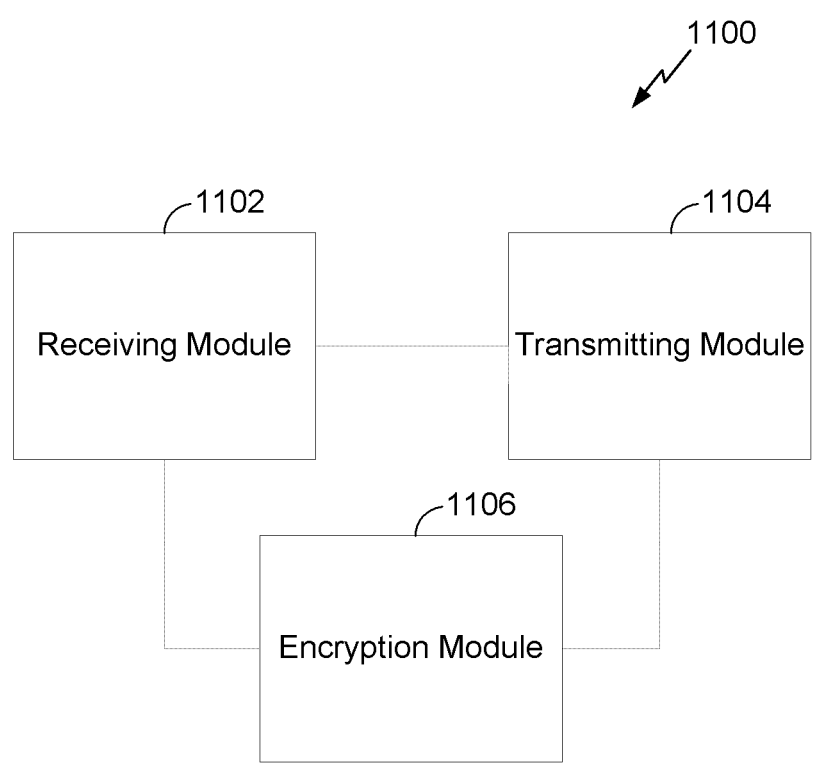
FIG. 11 is a functional block diagram of an exemplary wireless device that may be employed within the wireless communication system of FIG. 1.

FIG. 11 is a functional block diagram of an exemplary wireless device 1100 that may be employed within the wireless communication system of FIG. 1. The wireless device 1100 may include a receiving module 1102 for receiving one or more credentials communicated from an application. The receiving module 1102 may correspond to receiver 212, transceiver 214, memory 206, discovery engine 404, or the security module 408. The wireless device 1100 may further include an encryption module 1106 for encrypting at least a portion of a discovery packet using the one or more credentials of the application that, when executed, provides one or more services, the discovery packet including information for advertising at least one service provided by the application to one or more receiving devices. The encryption module 1106 may be configured to perform one or more functions discussed above with respect to block 1002 of FIG. 10. The encryption module 1106 may correspond to transmitter 210, transceiver 214, processor unit(s) 204, memory 206, discovery engine 404, or the security module 408. The wireless device 1100 may further include a transmitting module 1104 for transmitting the discovery packet for being received by one or more receiving devices. The transmitting module 1104 may be configured to perform one or more functions discussed above with respect to block 1004 of FIG. 10. The transmitting module 1104 may correspond to transmitter 210, transceiver 214, memory 206, or discovery engine 404.

Moreover, in one aspect, means for receiving one or more credentials communicated from an application may comprise the receiving module 1102. In another aspect, means for encrypting at least a portion of a discovery packet based on the one or more credentials may comprise the encrypting module 1104. In another aspect, means for transmitting the discovery packet to one or more receiving devices may comprise the transmitting module 1106.

Moreover, other modules may be included in the wireless device 1100, such as an authentication module for authenticating the one or more receiving devices from which the at least one paging packet is received using an authentication protocol.

Figure 12:
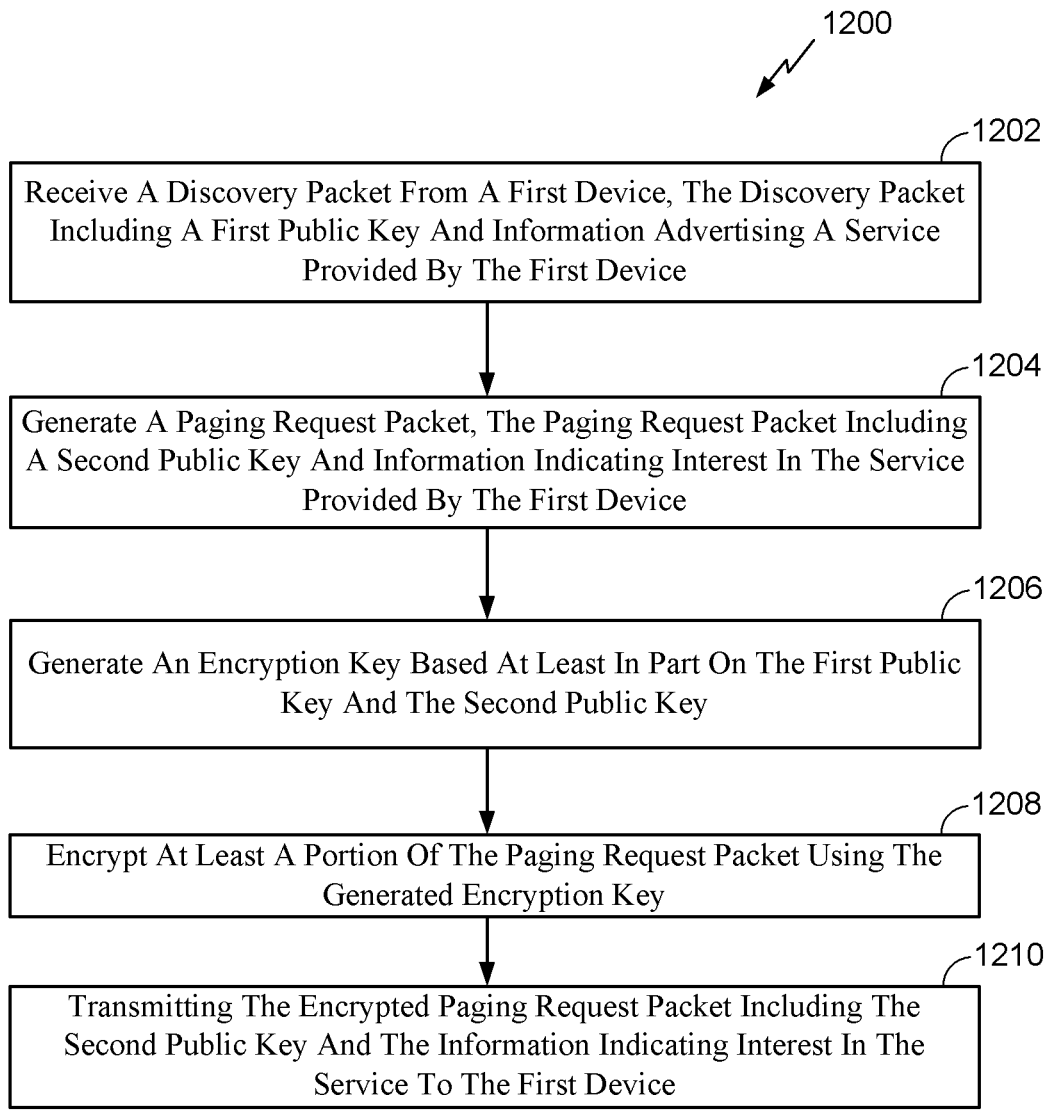
FIG. 12 is a flowchart of another exemplary process of securely transmitting packets in a wireless communication system in accordance with aspects of the present disclosure.

FIG. 12 is a flowchart of another exemplary process 1200 of securely transmitting packets in a wireless communication system in accordance with aspects of the present disclosure. The process 1200 may be used to secure packets sent between devices as discussed in the description of FIGS. 4 and 7, for example. Although the process 1200 is described below with respect to the elements of the wireless device 202, those having ordinary skill in the art will appreciate that other components may be used to implement one or more of the steps described herein.

The process 1200 begins at block 1202 by receiving a discovery packet from a first device, the discovery packet including a first public key and information advertising a service provided by the first device. The reception may be performed by the receiver 212, for example. At block 1204, the process 1200 continues by generating a paging request packet, the paging request packet including a second public key and information indicating interest in the service provided by the first device. At block 1206, the process 1200 generates an encryption key based at least in part on the first public key and the second public key. At block 1208, the process continues by transmitting the paging request packet including the second public key to one or more receiving devices. The transmission may be performed by the transmitter 214, for example.

Figure 13:
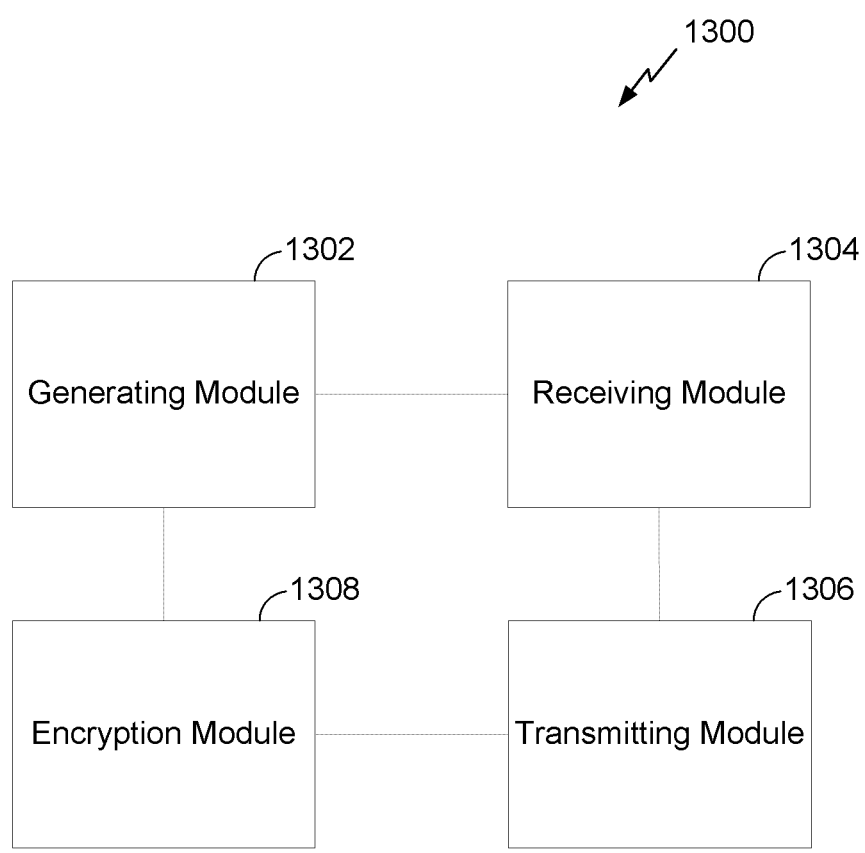
FIG. 13 is a functional block diagram of an exemplary wireless device that may be employed within the wireless communication system of FIG. 1.

FIG. 13 is a functional block diagram of an exemplary wireless device 1300 that may be employed within the wireless communication system of FIG. 1. The wireless device 1300 may include a generating module 1302 for generating a paging request packet, the paging request packet including a second public key and information indicating interest in the service provided by the first device, and further for generating an encryption key based at least in part on the first public key and the second public key. The generating module 1302 may be configured to perform one or more functions discussed above with respect to block 1204 and 1206 of FIG. 12. The generating module 1302 may correspond to processor unit(s) 204, memory 206, discovery engine 404, and/or the security module 408. The wireless device 1300 may further include receiving module 1304 for receiving a discovery packet from a first device, the discovery packet including a first public key and information advertising a service provided by the first device. The receiving module 1304 may be configured to perform one or more functions discussed above with respect to block 1202 of FIG. 12. The receiving module 1304 may correspond to receiver 212, transceiver 214, memory 206, discovery engine 404, or the security module 408. The wireless device 1300 may further include an encryption module 1308 for encrypting at least a portion of the paging request packet using the generated encryption key. The encryption module 1308 may be configured to perform one or more functions discussed above with respect to block 1208 of FIG. 12. The encryption module 1308 may correspond to processor unit(s) 204, memory 206, discovery engine 404, and/or the security module 408. The wireless device 1300 may further include a transmitting module 1306 for transmitting the encrypted paging request packet including the second public key and the information indicating interest in the service to the first device. The transmitting module 1306 may be configured to perform one or more functions discussed above with respect to block 1210 of FIG. 12. The transmitting module 1306 may correspond to transmitter 210, transceiver 214, memory 206, or discovery engine 404.

Moreover, in one aspect, means for receiving a discovery packet from a first device may comprise the receiving module 1304. In another aspect, means for generating a paging request packet including a second public key may comprise the generating module 1302. In another aspect, means for transmitting the paging request packet including the second public key to one or more receiving devices may comprise the transmitting module 1306.

Moreover, other modules may be included in the wireless device 1300, such as an encryption module for encrypting at least a portion of the paging request packet with the encryption key.

Figure 14:
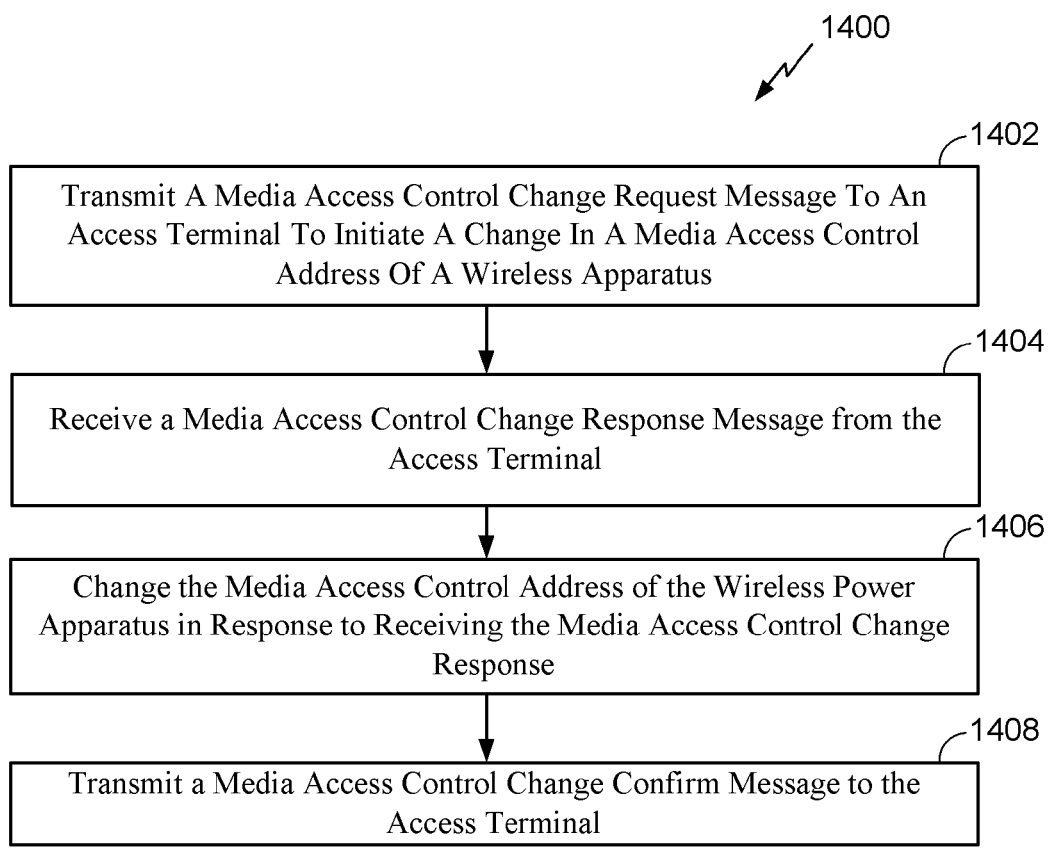
FIG. 14 is a flowchart of another exemplary process of securely transmitting packets in a wireless communication system using an access point in accordance with aspects of the present disclosure.

FIG. 14 is a flowchart of another exemplary process 1400 of securely transmitting packets in a wireless communication system in accordance with aspects of the present disclosure. The process 1400 may be used to secure packets sent between devices as discussed in the description of FIGS. 4 and 8, for example. Although the process 1400 is described below with respect to the elements of the wireless device 202, those having ordinary skill in the art will appreciate that other components may be used to implement one or more of the steps described herein.

The process 1400 begins at block 1402 by transmitting a medium access control change request message to an access terminal to initiate a change in a medium access control address of a wireless apparatus. The transmission may be performed by the transmitter 214, for example. At block 1404, the process 1400 continues by receiving a medium access control change response message from the access terminal. The reception may be performed by the receiver 212, for example. At block 1406, the process 1400 changes the medium access control address of the wireless power apparatus in response to receiving the medium access control change response. At block 1408, the process continues by transmitting a medium access control change confirm message to the access terminal.

Figure 15:
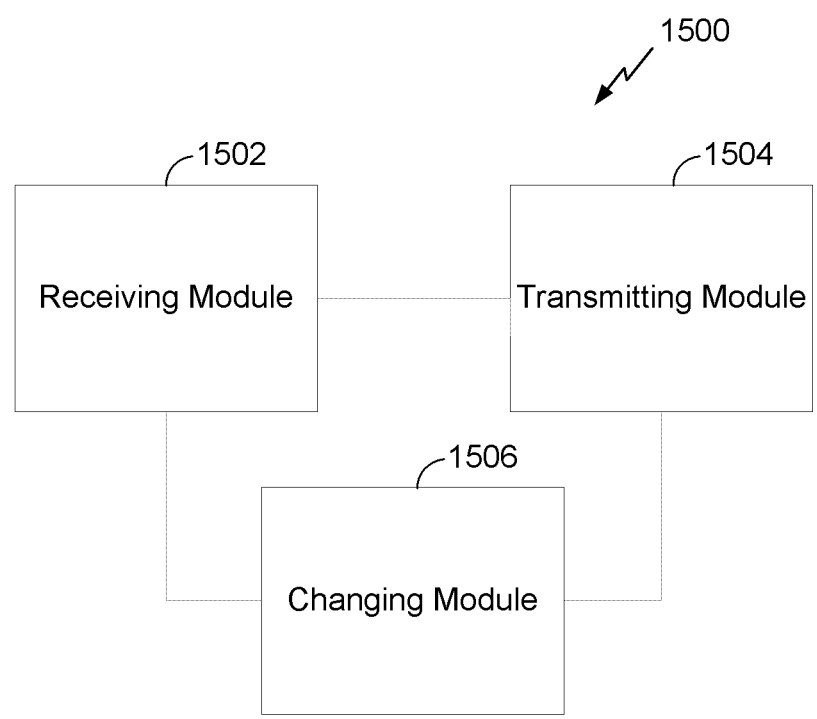
FIG. 15 is a functional block diagram of an exemplary wireless device that may be employed within the wireless communication system of FIG. 1.

FIG. 15 is a functional block diagram of an exemplary wireless device 1500 that may be employed within the wireless communication system of FIG. 1. The wireless device 1500 may include a transmitting module 1504 for transmitting a medium access control change request message to an access terminal to initiate a change in a medium access control address of a wireless apparatus and for transmitting a medium access control change confirm message to the access terminal. The transmitting module 1504 may be configured to perform one or more functions discussed above with respect to block 1402 and 1408 of FIG. 14. The transmitting module 1504 may correspond to transmitter 210, transceiver 214, memory 206, or discovery engine 404. The wireless device 1500 may further include receiving module 1502 for receiving a medium access control change response message from the access terminal. The receiving module 1502 may be configured to perform one or more functions discussed above with respect to block 1404 of FIG. 14. The receiving module 1502 may correspond to receiver 212, transceiver 214, memory 206, discovery engine 404, or the security module 408. The wireless device 1500 may further include a changing module 1506 for changing the medium access control address of the wireless power apparatus in response to receiving the medium access control change response. The changing module 1506 may be configured to perform one or more functions discussed above with respect to block 1406 of FIG. 14. The changing module 1506 may correspond to processor unit(s) 204, memory 206, discovery engine 404, or the security module 408.

Moreover, in one aspect, means for transmitting a medium access control change request message to an access terminal to initiate a change in a medium access control address of a wireless apparatus and means for transmitting a medium access control change confirm message to the access terminal may comprise the transmitting module 1504. In another aspect, means for receiving a medium access control change response message from the access terminal may comprise the receiving module 1502. In another aspect, means for changing the medium access control address of the wireless power apparatus in response to receiving the medium access control change response may comprise the changing module 1506.

Figure 16:
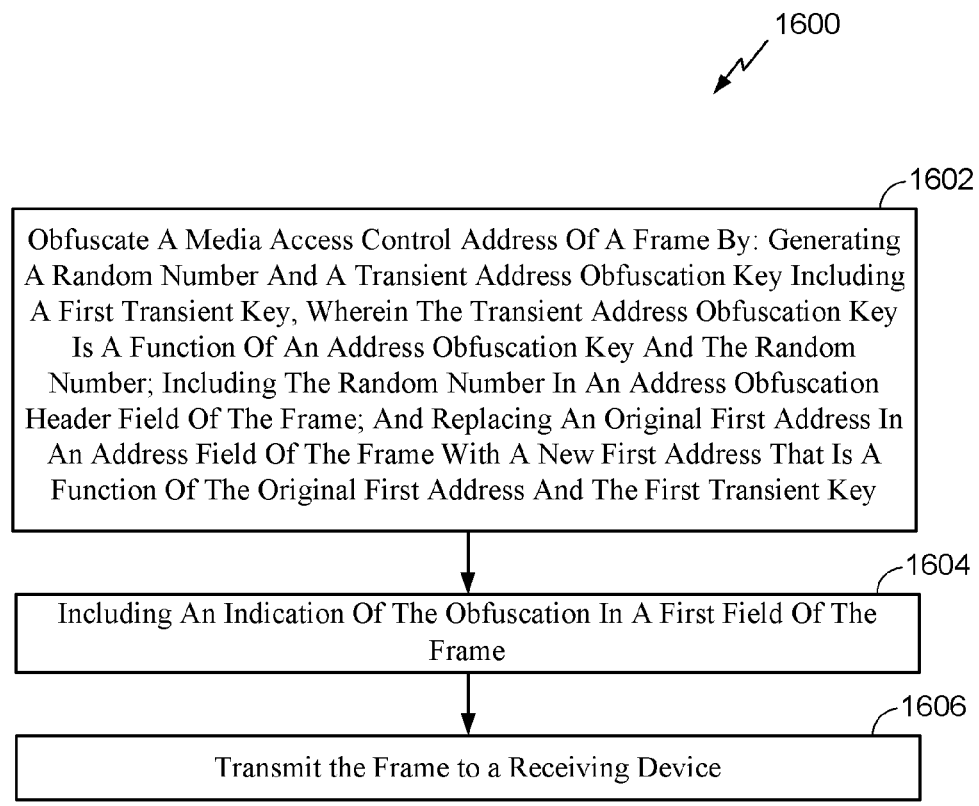
FIG. 16 is a flowchart of another exemplary process of securely transmitting packets in a wireless communication system using an access point in accordance with aspects of the present disclosure.

FIG. 16 is a flowchart of another exemplary process 1600 of securely transmitting packets in a wireless communication system in accordance with aspects of the present disclosure. The process 1600 may be used to secure packets sent between devices as discussed in the description of FIGS. 4 and 9, for example. Although the process 1600 is described below with respect to the elements of the wireless device 202, those having ordinary skill in the art will appreciate that other components may be used to implement one or more of the steps described herein.

The process 1600 begins at block 1602 by obfuscating a medium access control address of a frame by: generating a random number and a transient address obfuscation key including a first transient key, wherein the transient address obfuscation key is a function of an address obfuscation key and the random number; including the random number in an address obfuscation header field of the frame; and replacing an original first address in an address field of the frame with a new first address that is a function of the original first address and the first transient key. In some aspects, obfuscating the medium access control address of the frame further comprises generating a random number and a transient address obfuscation key including a first transient key, wherein the transient address obfuscation key is a function of an address obfuscation key and the random number. Obfuscating the medium access control address of the frame may further comprise including the random number in an address obfuscation header field of the frame and replacing an original first address in an address field of the frame with a new first address that is a function of the original first address and the first transient key.

The process 1600 may further comprise generating a frame check sequence field, generating a modified frame check sequence field that is a function of the frame check sequence field and a second transient key, and including the modified frame check sequence field in the frame. In some aspects, the function used to generate the modified frame check sequence field may be an exclusive-OR function.

In some aspects, the process 1600 further comprises obfuscating a medium access control address of each frame that is to be transmitted. Accordingly, the method 1600 may allow the change of medium access control addresses from packet to packet.

At block 1604, the process 1600 continues by including an indication of the obfuscation in a first field of the frame. For example, as described above with respect to FIG. 9, the frame control field 916 may include one or more bits that are used to indicate that the frame has an obfuscated medium access control address. At block 1606, the process 1600 continues by transmitting the frame to a receiving device. The transmission may be performed by the transmitter 214, for example.

Figure 17:
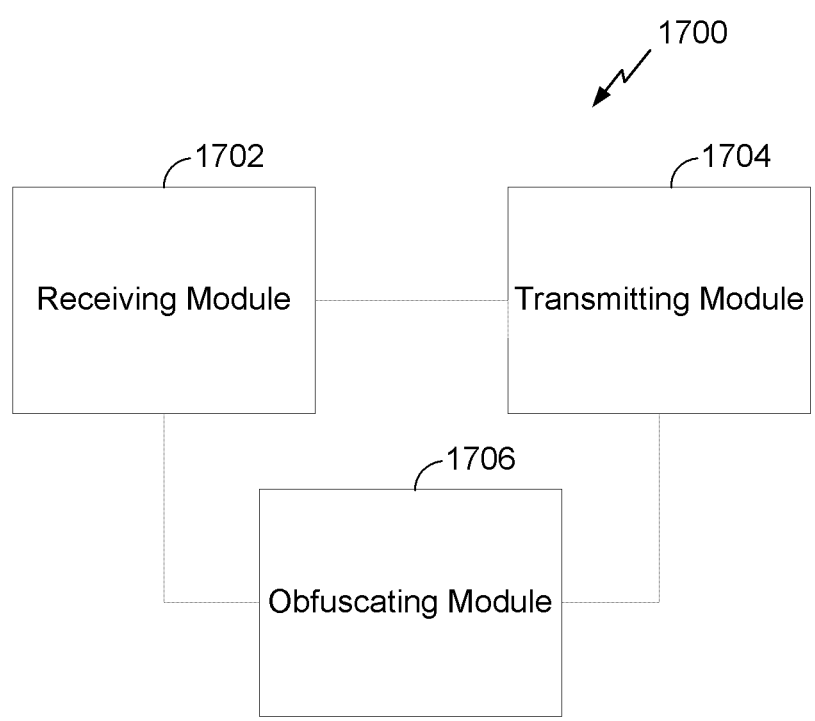
FIG. 17 is a functional block diagram of an exemplary wireless device that may be employed within the wireless communication system of FIG. 1.

FIG. 17 is a functional block diagram of an exemplary wireless device 1700 that may be employed within the wireless communication system of FIG. 1. The wireless device 1700 may include a receiving module 1702. The receiving module 1702 may correspond to receiver 212, transceiver 214, memory 206, discovery engine 404, or the security module 408. The wireless device 1700 may further include an obfuscating module 1706 for obfuscating a medium access control address of a frame by: generating a random number and a transient address obfuscation key including a first transient key, wherein the transient address obfuscation key is a function of an address obfuscation key and the random number; including the random number in an address obfuscation header field of the frame; and replacing an original first address in an address field of the frame with a new first address that is a function of the original first address and the first transient key. The obfuscating module 1706 may further including an indication of the obfuscation in a first field of the frame. The obfuscating module 1706 may be configured to perform one or more functions discussed above with respect to block 1602 and 1604 of FIG. 16. The obfuscating module 1706 may correspond to processor unit(s) 204, memory 206, discovery engine 404, or the security module 408. The wireless device 1700 may include a transmitting module 1704 for transmitting the frame to a receiving device. The transmitting module 1704 may be configured to perform one or more functions discussed above with respect to block 1606 of FIG. 16. The transmitting module 1704 may correspond to transmitter 210, transceiver 214, memory 206, or discovery engine 404.

Moreover, in one aspect, means for obfuscating a medium access control address of a frame may comprise the obfuscating module 1706. In another aspect, means for transmitting the frame to a receiving device may comprise the transmitting module 1704.

Moreover, other modules may be included in the wireless device 1700, such as generating module for generating a random number and a transient address obfuscation key including a first transient key, wherein the transient address obfuscation key is a function of an address obfuscation key and the random number. Further, the wireless device 1700 may include an inclusion module for including the random number in an address obfuscation header field of the frame. The wireless device 1700 may further include a replacing module for replacing an original first address in an address field of the frame with a new first address that is a function of the original first address and the first transient key.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may include one or more elements.

A person/one having ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-11 may be implemented within or performed by an integrated circuit (IC), an access terminal, or an access point. The IC may include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, and circuits may include antennas and/or transceivers to communicate with various components within the network or within the device. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules may be implemented in some other manner as taught herein. The functionality described herein (e.g., with regard to one or more of the accompanying figures) may correspond in some aspects to similarly designated "means for" functionality in the appended claims.

If implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Various modifications to the implementations described in this disclosure may be readily apparent to those skilled in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wireless apparatus operable in a wireless communication system comprising:
    a processor configured to:
        obfuscate a medium access control address of a frame by:
            generating a random number and a transient address obfuscation key including a first transient key, wherein the transient address obfuscation key is a function of an address obfuscation key and the random number;
            including the random number in an address obfuscation header field of the frame; and
            replacing an original first address in an address field of the frame with a new first address that is a function of the original first address and the first transient key;
        include an indication of the obfuscation in a first field of the frame;
        generate a frame check sequence field;
        generate a modified frame check sequence field that is a function of the frame check sequence field and a second transient key; and
        include the modified frame check sequence field in the frame; and
    a transmitter configured to transmit the frame to a receiving device.

2. The wireless apparatus of claim 1, wherein an exclusive-OR function is used to generate the modified frame check sequence field.

3. The wireless apparatus of claim 1, wherein the first field includes a frame control field.

4. The wireless apparatus of claim 1, wherein the processor is configured obfuscate a medium access control address of each frame that is to be transmitted by the wireless apparatus.

5. A method of securely transmitting packets in a wireless communication system, comprising:
    obfuscating a medium access control address of a frame by:
        generating a random number and a transient address obfuscation key including a first transient key, wherein the transient address obfuscation key is a function of an address obfuscation key and the random number;
        including the random number in an address obfuscation header field of the frame; and
        replacing an original first address in an address field of the frame with a new first address that is a function of the original first address and the first transient key;
    including an indication of the obfuscation in a first field of the frame;
    generating a frame check sequence field;
    generating a modified frame check sequence field that is a function of the frame check sequence field and a second transient key;
    including the modified frame check sequence field in the frame; and
    transmitting the frame to a receiving device.

6. The method of claim 5, wherein an exclusive-OR function is used to generate the modified frame check sequence field.

7. The method of claim 5, wherein the first field includes a frame control field.

8. The method of claim 5, further comprising obfuscating a medium access control address of each frame that is to be transmitted.

9. A computer program product, comprising:
    a non-transitory computer-readable medium comprising:
        code that, when executed by a computer, causes the computer to obfuscate a medium access control address of a frame comprising:
            code for generating a random number and a transient address obfuscation key including a first transient key, wherein the transient address obfuscation key is a function of an address obfuscation key and the random number;
            code for including the random number in an address obfuscation header field of the frame; and
            code for replacing an original first address in an address field of the frame with a new first address that is a function of the original first address and the first transient key;
        code that, when executed by the computer, causes the computer to include an indication of the obfuscation in a first field of the frame;
        code for generate a frame check sequence field; and
        code for generating a modified frame check sequence field that is a function of the frame check sequence field and a second transient key;

code for including the modified frame check sequence field in the frame; and code that, when executed by the computer, causes the computer to transmit the frame to a receiving device.

10. The computer program product of claim 9, wherein an exclusive-OR function is used to generate the modified frame check sequence field.

11. The computer program product of claim 9, wherein the first field includes a frame control field.

12. The wireless apparatus of claim 9, wherein the code that causes the computer to obfuscate further comprises code that, when executed by the computer, causes the computer to obfuscate a medium access control address of each frame that is to be transmitted.

* * * * *